United States Patent
Doan et al.

(10) Patent No.: US 11,277,288 B2
(45) Date of Patent: Mar. 15, 2022

(54) FIXED-LENGTH PROBABILISTIC AMPLITUDE SHAPING

(71) Applicant: QUALCOMM Incorporated, San Diego, CA (US)

(72) Inventors: Dung Ngoc Doan, San Diego, CA (US); Lin Yang, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/163,771

(22) Filed: Feb. 1, 2021

(65) Prior Publication Data
US 2021/0243058 A1    Aug. 5, 2021

Related U.S. Application Data

(60) Provisional application No. 62/969,407, filed on Feb. 3, 2020.

(51) Int. Cl.
*H04L 27/04* (2006.01)
*H04L 27/06* (2006.01)
*H04L 1/00* (2006.01)
*H04L 27/00* (2006.01)

(52) U.S. Cl.
CPC .......... *H04L 27/04* (2013.01); *H04L 1/0063* (2013.01); *H04L 27/0014* (2013.01); *H04L 27/06* (2013.01); *H04L 2027/0083* (2013.01)

(58) Field of Classification Search
CPC ..... H04L 1/0042; H04L 1/0058; H04L 27/04; H04L 1/0063; H04L 27/0014; H04L 27/06; H04L 2027/0083
See application file for complete search history.

(56) References Cited

U.S. PATENT DOCUMENTS

| 10,200,231 B1* | 2/2019 | Lefevre | H04L 27/2628 |
| 2019/0052509 A1* | 2/2019 | Krishnan | H04L 27/0008 |

FOREIGN PATENT DOCUMENTS

| EP | 3547572 A1 | 10/2019 |
| WO | WO-2018133939 A1 | 7/2018 |
| WO | WO-2021055411 A1 | 3/2021 |

OTHER PUBLICATIONS

International Search Report and Written Opinion—PCT/US2021/016167—ISA/EPO—dated Jun. 4, 2021.

* cited by examiner

*Primary Examiner* — Sung S Ahn
(74) *Attorney, Agent, or Firm* — Paradice and Li LLP; Kevin M. Donnelly

(57) ABSTRACT

This disclosure provides methods, devices and systems for encoding data for wireless communication to achieve probabilistic amplitude shaping. In some implementations, a transmitting device may achieve a fixed information block length (N), at least in part, by iteratively encoding the information bits until the number of amplitude-shaped bits combined with the number of unshaped bits is greater than or equal to a maximum payload length. For example, the maximum payload length may be equal to N. If the resulting number of amplitude-shaped bits plus the number of unshaped bits is less than N, the transmitting device may add one or more padding bits to the information block to achieve the fixed information block length.

34 Claims, 19 Drawing Sheets

| | | | | | |
|---|---|---|---|---|---|
| 702a | 0 | 0 | | | 1/4 |
| 702b | 0 | 1 | | | 1/4 |
| 702c | 1 | 1 | 1 | | 1/8 |
| 702d | 1 | 0 | 0 | | 1/8 |
| 702e | 1 | 0 | 1 | | 1/8 |
| 702f | 1 | 1 | 0 | 1 | 1/16 |
| 702g | 1 | 1 | 0 | 0 | 0 | 1/32 |
| 702h | 1 | 1 | 0 | 0 | 1 | 1/32 |

*Figure 7*

FIXED-LENGTH PROBABILISTIC AMPLITUDE SHAPING

CROSS-REFERENCE TO RELATED APPLICATIONS

This Patent Application claims priority to U.S. Provisional Patent Application No. 62/969,407 entitled "FIXED-LENGTH PROBABILISTIC AMPLITUDE SHAPING" and filed on Feb. 3, 2020, which is assigned to the assignee hereof. The disclosure of the prior Application is considered part of and are incorporated by reference in this Patent Application.

TECHNICAL FIELD

This disclosure relates generally to wireless communication, and more specifically, to encoding data to achieve a non-uniform amplitude distribution using fixed-length information blocks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Transmitting and receiving devices may support the use of various modulation and coding schemes (MCSs) to transmit and receive data so as to optimally take advantage of wireless channel conditions, for example, to increase throughput, reduce latency, or enforce various quality of service (QoS) parameters. For example, existing technology supports the use of up to 1024-QAM and it is expected that 4096-QAM (also referred to as "4k QAM") will also be implemented. 1024-QAM and 4096-QAM, among other MCSs, involve the use of low-density parity check (LDPC) encoding. An LDPC encoding operation may be performed on the data bits of a code block to, for example, add redundancy for forward error correction (FEC).

Real world wireless channels generally contain noise that imposes a limit on the maximum rate at which data can be communicated. The Shannon-Hartley theorem establishes an upper bound or limit (referred to as the "Shannon bound") that represents the absolute channel capacity of a link, that is, the maximum amount of error-free information per unit time that can be transmitted over a particular bandwidth in the presence of noise. Unfortunately, the channel capacity achievable with LDPC encoding shows a significant gap to the Shannon bound even for high MCSs. Additionally, to be able to use high MCSs, including 1024-QAM and 4096-QAM, a high signal-to-noise ratio (SNR) is required, but it may be difficult to obtain the SNRs needed for such high MCSs.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include obtaining a first information block that includes a fixed number (N1) of information bits; performing a first encoding operation on one or more of the information bits that produces a number ($L_S$) of amplitude-shaped bits; arranging the $L_S$ amplitude-shaped bits into a second information block that includes a number ($L_{US}$) of the information bits from the first information block, where the sum of $L_S$ and $L_{US}$ is less than or equal to a fixed amount (N2); selectively adding one or more padding bits to the second information block so that a length of the second information block is equal to N2; adding, to the second information block, one or more signaling bits indicating the number of amplitude-shaped bits in the second information block; performing a second encoding operation on the second information block that produces one or more codewords, where each codeword includes a respective subset of bits of the second information block and one or more parity bits resulting from the second encoding operation; arranging the subsets of bits of the second information block and the parity bits into a plurality of symbols, where each symbol has an amplitude based on the respective bits arranged in the symbol, and where the first encoding operation produces the amplitude-shaped bits so that the amplitudes of the plurality of symbols have a non-uniform distribution; and transmitting a wireless packet, including the plurality of symbols, to at least one receiving device.

In some implementations, the performing of the first encoding operation may include iteratively selecting, from a look-up table (LUT), a pattern of bit values that matches a subset of the information bits, where the LUT stores a plurality of patterns of bit values corresponding to a respective plurality of patterns of amplitude-shaped bits, and where the plurality of patterns of amplitude-shaped bits includes the pattern of amplitude-shaped bits corresponding to the selected pattern of bit values. In some implementations, the iterative selecting of the pattern of bit values may further include determining, for each iteration, whether the selection of a first pattern of bit values matching a first subset of the information bits would cause the sum of $L_S$ and $L_{US}$ to be greater than N2. In some implementations, the iterative selecting of the pattern of bit values may further include terminating the first encoding operation, without selecting the first pattern of bit values, responsive to determining that selecting the first pattern of bit values would cause the sum of $L_S$ and $L_{US}$ to be greater than N2.

In some other implementations, the iterative selecting of the pattern of bit values may further include determining whether the selection of a second pattern of bit values matching a second subset of the information bits would cause the sum of $L_S$ and $L_{US}$ to be less than or equal to N2 responsive to determining that selecting the first pattern of bit values would cause the sum of $L_S$ and $L_{US}$ to be greater than N2. In some aspects, the second subset of the information bits may be larger than the first subset of the information bits. In some implementations, the iterative selecting of the pattern of bit values may further include responsive to determining that the resulting sum of $L_S$ and $L_{US}$ would be less than or equal N2; and terminating the first encoding operation responsive to selecting the second pattern of bit values. In some implementations, the adding of the one or more signaling bits may include determining a number ($L_{PAM}$) of symbols associated with the amplitude-shaped bits; determining an estimated number of amplitude-shaped bits associated with the wireless packet based on a length of each pattern of amplitude-shaped bits in the LUT; and determining a number ($L_{EST}$) of symbols associated with the estimated number of amplitude-shaped bits, where the one or more signaling bits represents a value equal to the difference between $L_{PAM}$ and $L_{EST}$.

In some other implementations, the adding of the one or more signaling bits may include determining a number ($L_{PAM}$) of symbols associated with the amplitude-shaped bits, where the one or more signaling bits represents a value equal to $L_{PAM}$. In some other implementations, the adding of the one or more signaling bits may include determining a number ($L_{PAM}$) of symbols associated with the amplitude-shaped bits; determining a mean number of amplitude-shaped bits encodable based on the first encoding operation given N1 information bits; and determining a number ($L_{MEAN}$) of symbols associated with the mean number of amplitude-shaped bits, where the one or more signaling bits represents a value equal to the difference between LPAM and $L_{MEAN}$. In some other implementations, the adding of the one or more signaling bits may include determining a number of symbols associated with the information bits in the second information block, where the one or more signaling bits represents a value equal to the number of symbols associated with the information bits in the second information block. Still further, in some implementations, the one or more signaling bits may represent a value equal to a number of padding bits included in the second information block.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including obtaining a first information block that includes a fixed number (N1) of information bits; performing a first encoding operation on one or more of the information bits that produces a number ($L_S$) of amplitude-shaped bits; arranging the $L_S$ amplitude-shaped bits into a second information block that includes a number ($L_{US}$) of the information bits from the first information block, where the sum of $L_S$ and $L_{US}$ is less than or equal to a fixed amount (N2); selectively adding one or more padding bits to the second information block so that a length of the second information block is equal to N2; adding, to the second information block, one or more signaling bits indicating the number of amplitude-shaped bits in the second information block; performing a second encoding operation on the second information block that produces one or more codewords, where each codeword includes a respective subset of bits of the second information block and one or more parity bits resulting from the second encoding operation; arranging the subsets of bits of the second information block and the parity bits into a plurality of symbols, where each symbol has an amplitude based on the respective bits arranged in the symbol, and where the first encoding operation produces the amplitude-shaped bits so that the amplitudes of the plurality of symbols have a non-uniform distribution; and transmitting a wireless packet, including the plurality of symbols, to at least one receiving device.

Another innovative aspect of the subject matter described in this disclosure can be implemented as a method of wireless communication. The method may be performed by a wireless communication device, and may include receiving a wireless packet including a plurality of symbols having a plurality of amplitudes, where the plurality of symbols represents a plurality of codeword bits, and where the plurality of amplitudes has a non-uniform distribution; arranging the plurality of codeword bits into one or more codewords; performing a first decoding operation on the one or more codewords that produces one or more respective decoded code blocks, where each decoded code block includes a plurality of decoded codeword bits and one or more parity bits; arranging the pluralities of decoded codeword bits into an information block having a fixed length (N2); detecting one or more signaling bits of the information block based on the fixed length N2 of the information block; identifying a number ($L_S$) of amplitude-shaped bits in the information block based on a value associated with the one or more signaling bits; performing a second decoding operation on the amplitude-shaped bits that produces a number ($L_{DS}$) of de-shaped bits; parsing a number ($L_{US}$) of unshaped bits from the information block based on the number $L_{DS}$ of de-shaped bits and a fixed length (N1) associated with a decoded information block; and arranging the de-shaped bits and the unshaped bits into the decoded information block having the fixed length N1.

In some implementations, the amplitude-shaped bits may represent most significant bits (MSB s) of the information block. In some implementations, the sum of $L_{US}$ and $L_{DS}$ may be equal to N2. In some implementations, the method may further include discarding one or more bits of the information block in excess of $L_{US}$. In some implementations, the discarded bits may represent least significant bits (LSB s) of the information block.

In some implementations, the performing of the second decoding operation may include selecting, from an LUT, a pattern of de-shaped bits that matches a subset of the amplitude-shaped bits, where the LUT stores a plurality of patterns of de-shaped bits corresponding to a respective plurality of patterns of amplitude-shaped bits, and where the plurality of de-shaped bits includes the selected pattern of de-shaped bits. In some implementations, the identifying of the number of amplitude-shaped bits may include determining an estimated number of amplitude-shaped bits associated with the wireless packet based on a length of each pattern of amplitude-shaped bits in the LUT; determining a number ($L_{EST}$) of symbols associated with the estimated number of amplitude-shaped bits; determining a number ($L_{PAM}$) of symbols associated with the amplitude-shaped bits based on a difference between $L_{EST}$ and the value associated with the one or more signaling bits; and determining the number of amplitude-shaped bits associated with $L_{PAM}$.

In some other implementations, the identifying of the number of amplitude-shaped bits may include determining a number ($L_{PAM}$) of symbols associated with the amplitude-shaped bits based on the value associated with the one or more signaling bits; and determining the number of amplitude-shaped bits associated with $L_{PAM}$. In some other implementations, the identifying of the number of amplitude-shaped bits may include determining a mean number of amplitude-shaped bits decodable based on the second decoding operation given N1 information bits; determining a number ($L_{MEAN}$) of symbols associated with the mean number of amplitude-shaped bits; determining a number ($L_{PAM}$) of symbols associated with the amplitude-shaped bits based on a difference between $L_{MEAN}$ and the value associated with the one or more signaling bits; and determining the number of amplitude-shaped bits associated with $L_{PAM}$. Still further, in some implementations, the identifying of the number of amplitude-shaped bits may include determining a number of padding bits included in the information block based on the value associated with the one or more signaling bits; and determining the number of amplitude-shaped bits based on N2, $L_{US}$, and the number of padding bits.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving a wireless packet including a plurality of symbols having a plurality of amplitudes, where the plurality of symbols represents a plurality of codeword bits, and where the plurality of amplitudes has a non-uniform distribution; arranging the plurality of codeword bits into one or more codewords; performing a first decoding operation on the one or more codewords that produces one or more respective decoded code blocks, where each decoded code block includes a plurality of decoded codeword bits and one or more parity bits; arranging the pluralities of decoded codeword bits into an information block having a fixed length (N2); detecting one or more signaling bits of the information block based on the fixed length N2 of the information block; identifying a number ($L_S$) of amplitude-shaped bits in the information block based on a value associated with the one or more signaling bits; performing a second decoding operation on the amplitude-shaped bits that produces a number ($L_{DS}$) of de-shaped bits; parsing a number ($L_{US}$) of unshaped bits from the information block based on the number $L_{DS}$ of de-shaped bits and a fixed length (N1) associated with a decoded information block; and arranging the de-shaped bits and the unshaped bits into the decoded information block having the fixed length N1.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 7 shows an example look-up table (LUT) that supports amplitude shaping according to some implementations.

DETAILED DESCRIPTION

Figure 1:
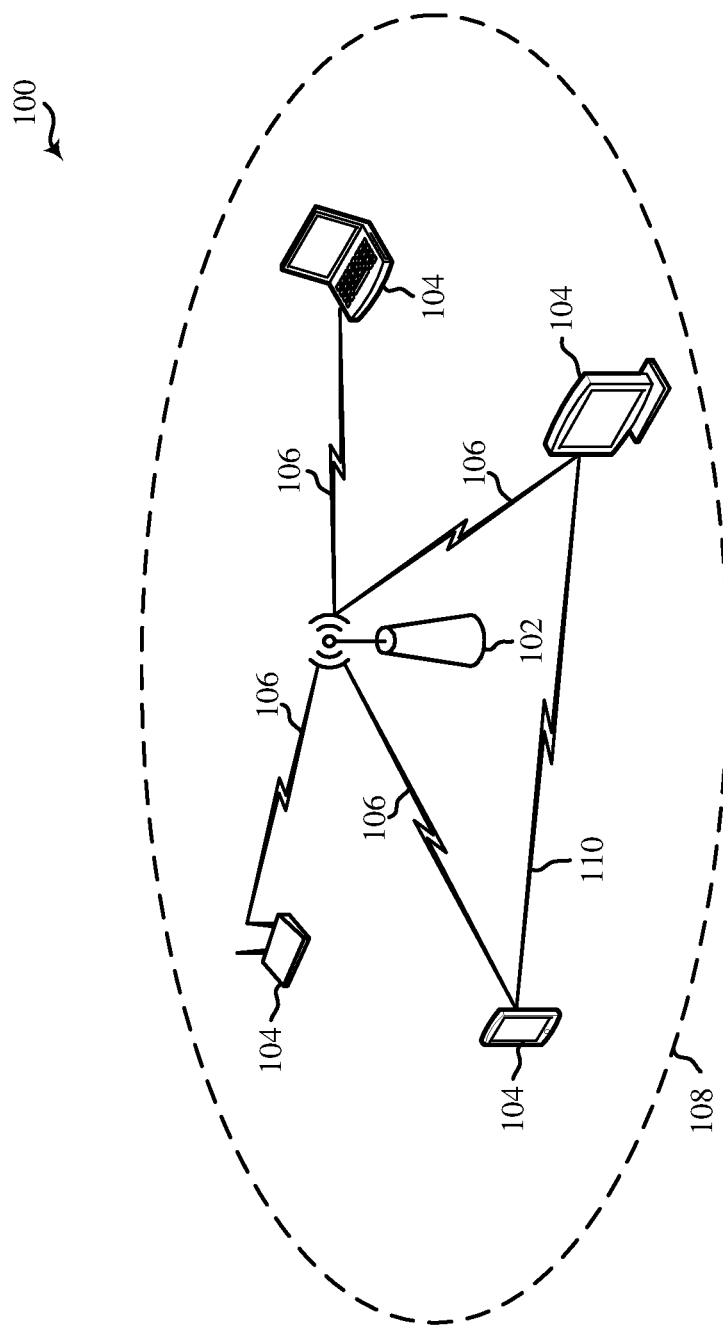
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various aspects relate generally to encoding data for wireless communication to achieve a desired amplitude distribution, and more particularly, to performing a first encoding operation on information bits of a fixed-length information block to shape the amplitudes of the resultant symbols such that the amplitudes have a non-uniform distribution. In some aspects of the non-uniform distribution, the probabilities associated with the respective amplitudes generally increase with decreasing amplitude. For example, the non-uniform distribution of the amplitudes of the symbols may be approximately Gaussian. In some aspects, the first encoding operation is or includes a prefix encoding operation that maps one or more patterns of information bits to one or more patterns of amplitude-shaped bits such that the probabilities associated with encoding information bits into symbols with lower amplitudes are greater than the probabilities associated with encoding information bits into symbols with higher amplitudes. In some aspects, the first encoding operation also may achieve a fixed-length information block at its output, at least in part, by iteratively encoding the information bits until the number of amplitude-shaped bits combined with the number of unshaped bits is greater than or equal to a maximum payload length.

Particular implementations of the subject matter described in this disclosure can be implemented to realize one or more of the following potential advantages. In some implementations, the described techniques can be used to close the gap between the channel capacity actually attainable by a transmitting device and the theoretical Shannon bound, for example, by encoding the amplitudes such that the resultant amplitude distributions are approximately Gaussian. In the present implementations, the packet length may be held to a fixed size without forcing the amplitude shaping operation to maintain a fixed coding rate. By maintaining fixed information block lengths before and after amplitude shaping, aspects of the present disclosure may enable the medium access control (MAC) layer to determine the number of padding bits to be added to the information block (to produce an integer number of symbols) without having to first perform the amplitude shaping operation. Further, by preserving the variable coding rate of the amplitude shaping operation, aspects of the present disclosure may support optimal encoding of the amplitude-shaped bits.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Figure 2A:
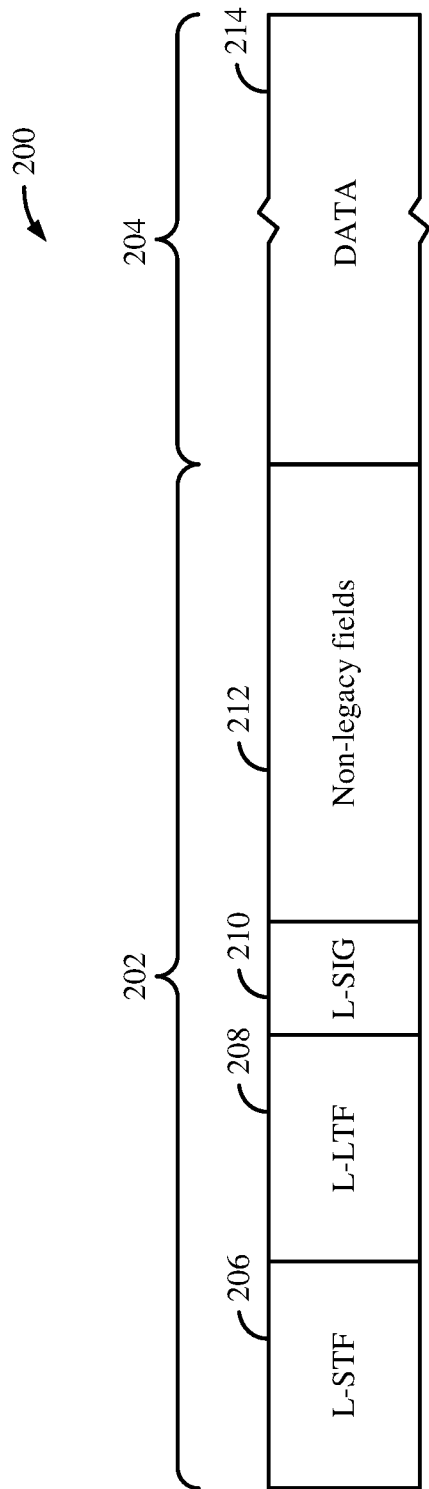
FIG. 2A shows an example protocol data unit (PDU) usable for communications between an access point (AP) and a number of stations (STAs).

FIG. 2A shows an example protocol data unit (PDU) 200 usable for wireless communication between an AP and a number of STAs. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol standards.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
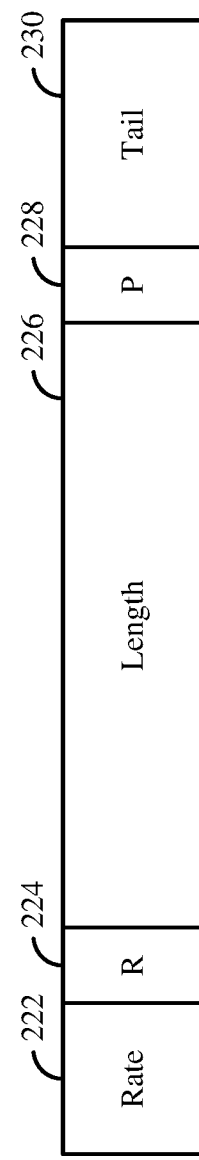
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
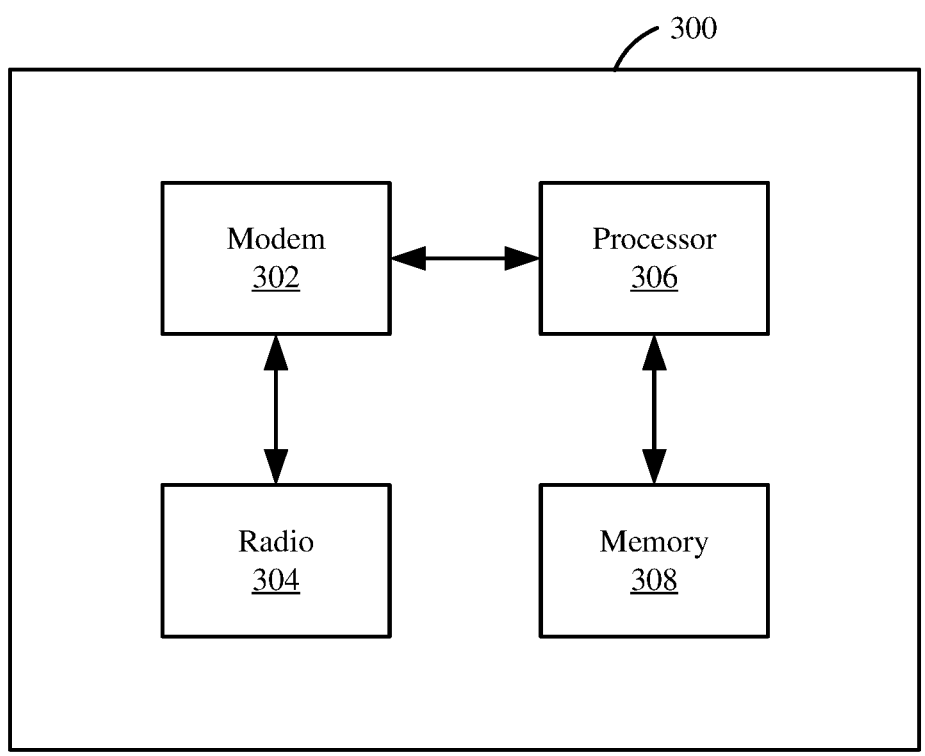
FIG. 3 shows a block diagram of an example wireless communication device.

FIG. 3 shows a block diagram of an example wireless communication device 400. In some implementations, the wireless communication device 300 can be an example of a device for use in a STA such as one of the STAs 104 described with reference to FIG. 1. In some implementations, the wireless communication device 300 can be an example of a device for use in an AP such as the AP 102 described with reference to FIG. 1. The wireless communication device 300 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 300 can be, or can include, a chip, system on chip (SoC), chipset, package or device that includes one or more modems 302, for example, a Wi-Fi (IEEE 802.11 compliant) modem. In some implementations, the one or more modems 302 (collectively "the modem 302") additionally include a WWAN modem (for example, a 3GPP 4G LTE or 5G compliant modem). In some implementations, the wireless communication device 300 also includes one or more radios 304 (collectively "the radio 304"). In some implementations, the wireless communication device 306 further includes one or more processors, processing blocks or processing elements 306 (collectively "the processor 306") and one or more memory blocks or elements 308 (collectively "the memory 308").

The modem 302 can include an intelligent hardware block or device such as, for example, an application-specific integrated circuit (ASIC) among other possibilities. The modem 302 is generally configured to implement a PHY layer. For example, the modem 302 is configured to modulate packets and to output the modulated packets to the radio 304 for transmission over the wireless medium. The modem 302 is similarly configured to obtain modulated packets received by the radio 304 and to demodulate the packets to provide demodulated packets. In addition to a modulator and a demodulator, the modem 302 may further include digital signal processing (DSP) circuitry, automatic gain control (AGC), a coder, a decoder, a multiplexer and a demultiplexer. For example, while in a transmission mode, data obtained from the processor 306 is provided to a coder, which encodes the data to provide encoded bits. The encoded bits are then mapped to points in a modulation constellation (using a selected MCS) to provide modulated symbols. The modulated symbols may then be mapped to a number Nss of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 304. In implementations involving beamforming, the modulated symbols in the respective spatial streams are precoded via a steering matrix prior to their provision to the IFFT block.

While in a reception mode, digital signals received from the radio 304 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 306) for processing, evaluation or interpretation.

The radio 304 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 300 can include, or be coupled with, multiple transmit antennas (each with a corresponding transmit chain) and multiple receive antennas (each with a corresponding receive chain). The symbols output from the modem 302 are provided to the radio 304, which then transmits the symbols via the coupled antennas.

Similarly, symbols received via the antennas are obtained by the radio 304, which then provides the symbols to the modem 302.

The processor 306 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 306 processes information received through the radio 304 and the modem 302, and processes information to be output through the modem 302 and the radio 304 for transmission through the wireless medium. For example, the processor 306 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 306 may generally control the modem 302 to cause the modem to perform various operations described above.

The memory 304 can include tangible storage media such as random-access memory (RAM) or read-only memory (ROM), or combinations thereof. The memory 304 also can store non-transitory processor- or computer-executable software (SW) code containing instructions that, when executed by the processor 306, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 4B:
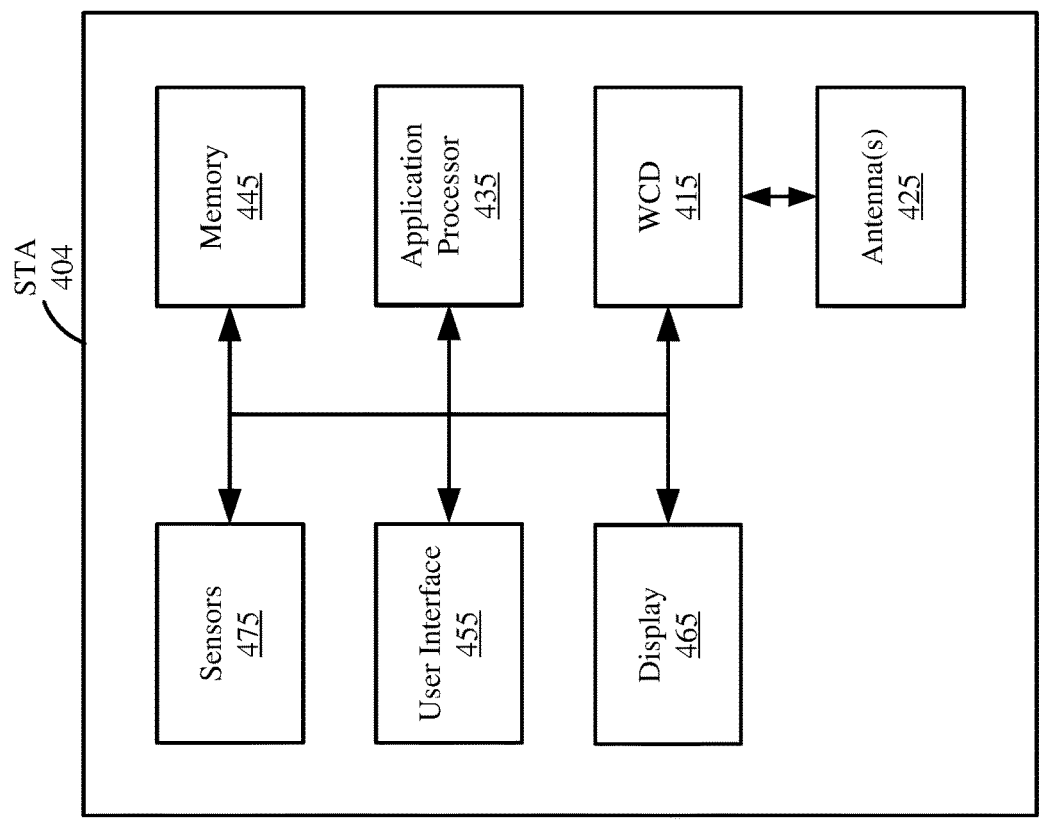
FIG. 4B shows a block diagram of an example station (STA).
Figure 4A:
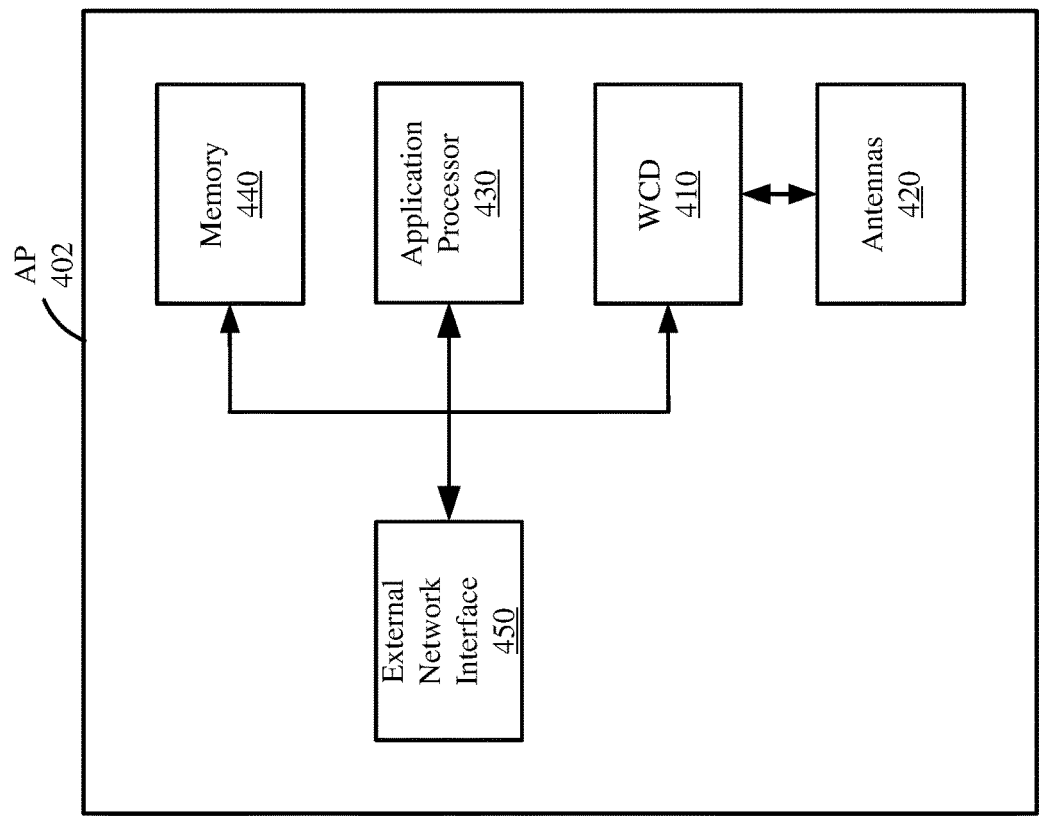
FIG. 4A shows a block diagram of an example access point (AP).

FIG. 4A shows a block diagram of an example AP 402. For example, the AP 402 can be an example implementation of the AP 102 described with reference to FIG. 1. The AP 402 includes a wireless communication device (WCD) 410 (although the AP 402 may itself also be referred to generally as a wireless communication device as used herein). For example, the wireless communication device 410 may be an example implementation of the wireless communication device 300 described with reference to FIG. 3. The AP 402 also includes multiple antennas 420 coupled with the wireless communication device 410 to transmit and receive wireless communications. In some implementations, the AP 402 additionally includes an application processor 430 coupled with the wireless communication device 410, and a memory 440 coupled with the application processor 430. The AP 402 further includes at least one external network interface 450 that enables the AP 402 to communicate with a core network or backhaul network to gain access to external networks including the Internet. For example, the external network interface 450 may include one or both of a wired (for example, Ethernet) network interface and a wireless network interface (such as a WWAN interface). Ones of the aforementioned components can communicate with other ones of the components directly or indirectly, over at least one bus. The AP 402 further includes a housing that encompasses the wireless communication device 410, the application processor 430, the memory 440, and at least portions of the antennas 420 and external network interface 450.

FIG. 4B shows a block diagram of an example STA 404. For example, the STA 404 can be an example implementation of the STA 104 described with reference to FIG. 1. The STA 404 includes a wireless communication device 415 (although the STA 404 may itself also be referred to generally as a wireless communication device as used herein). For example, the wireless communication device 415 may be an example implementation of the wireless communication device 300 described with reference to FIG. 3. The STA 404 also includes one or more antennas 425 coupled with the wireless communication device 415 to transmit and receive wireless communications. The STA 404 additionally includes an application processor 435 coupled with the wireless communication device 415, and a memory 445 coupled with the application processor 435. In some implementations, the STA 404 further includes a user interface (UI) 455 (such as a touchscreen or keypad) and a display 465, which may be integrated with the UI 455 to form a touchscreen display. In some implementations, the STA 404 may further include one or more sensors 475 such as, for example, one or more inertial sensors, accelerometers, temperature sensors, pressure sensors, or altitude sensors. Ones of the aforementioned components can communicate with other ones of the components directly or indirectly, over at least one bus. The STA 404 further includes a housing that encompasses the wireless communication device 415, the application processor 435, the memory 445, and at least portions of the antennas 425, UI 455, and display 465.

Transmitting and receiving devices may support the use of various modulation and coding schemes (MCSs) to transmit and receive data so as to optimally take advantage of wireless channel conditions, for example, to increase throughput, reduce latency, or enforce various quality of service (QoS) parameters. For example, existing technology supports the use of up to 1024-QAM and it is expected that 4096-QAM (also referred to as "4k QAM") will also be implemented. 1024-QAM and 4096-QAM, among other MCSs, involve the use of low-density parity check (LDPC) encoding. For example, a PHY layer of the transmitting device may receive one or more MPDUs or A-MPDUs from a MAC layer of the transmitting device in the form of a PSDU. The PSDU may be arranged into multiple code blocks, each of which contains primary information (or "systematic information") representative of some or all of one or more of the MPDUs in the form of information bits. Some of the information bits (also referred to herein as "amplitude bits") in the code block are used to determine the amplitudes of the symbols to be modulated and transmitted to the receiving device. An LDPC encoding operation may be performed on the information bits in the code block to, for example, encode the data bits to add redundancy for forward error correction. Because LDPC encoding is an example of systematic encoding, the LDPC encoding operation does not change the data bits; rather, the amplitude bits output from the LDPC encoder are the same as the amplitude bits input to the LDPC encoder. In other words, the values of the amplitude bits used for the modulation come directly from the initial code block.

Real world wireless channels generally contain noise that imposes a limit on the maximum rate at which data can be communicated. The Shannon-Hartley theorem establishes an upper bound or limit (referred to as the "Shannon bound") that represents the absolute channel capacity of a link, that is, the maximum amount of error-free information per unit time that can be transmitted over a particular bandwidth in the presence of noise. Equation (1) below shows one representation of the Shannon-Hartley theorem.

$$C = B \log_2(1+SNR) \quad (1)$$

In Equation (1), C represents the channel capacity in bits per second, B represents the bandwidth in hertz, and SNR represents the signal-to-noise ratio defined as the ratio of the average received signal power to the average power of the noise and interference. Unfortunately, the channel capacity achievable with LDPC encoding shows a significant gap to the Shannon bound even for high MCSs. Additionally, to be able to use high MCSs, including 1024-QAM and 4096-QAM, high SNR is required, but it may be difficult to obtain the SNRs needed for such high MCSs.

Various aspects relate generally to encoding data for wireless communication to achieve a desired amplitude distribution, and more particularly, to performing a first encoding operation on information bits of a fixed-length information block to shape the amplitudes of the resultant symbols such that the amplitudes have a non-uniform distribution. In some aspects of the non-uniform distribution, the probabilities associated with the respective amplitudes generally increase with decreasing amplitude. For example, the non-uniform distribution of the amplitudes of the symbols may be approximately Gaussian. In some aspects, the first encoding operation is or includes a prefix encoding operation that maps one or more patterns of information bits to one or more patterns of amplitude-shaped bits such that the probabilities associated with encoding information bits into symbols with lower amplitudes are greater than the probabilities associated with encoding information bits into symbols with higher amplitudes. In some aspects, the first encoding operation also may achieve a fixed-length information block at its output, at least in part, by iteratively encoding the information bits until the number of amplitude-shaped bits combined with the number of unshaped bits is greater than or equal to a maximum payload length.

Particular implementations of the subject matter described in this disclosure can be implemented to realize one or more of the following potential advantages. In some implementations, the described techniques can be used to close the gap between the channel capacity actually attainable by a transmitting device and the theoretical Shannon bound, for example, by encoding the amplitudes such that the resultant amplitude distributions are approximately Gaussian. In the present implementations, the packet length may be held to a fixed size without forcing the amplitude shaping operation to maintain a fixed coding rate. By maintaining fixed information block lengths before and after amplitude shaping, aspects of the present disclosure may enable the MAC layer to determine the number of padding bits to be added to the information block (to produce an integer number of symbols) without having to first perform the amplitude shaping operation. Further, by preserving the variable coding rate of the amplitude shaping operation, aspects of the present disclosure may support optimal encoding of the amplitude-shaped bits.

Figure 5:
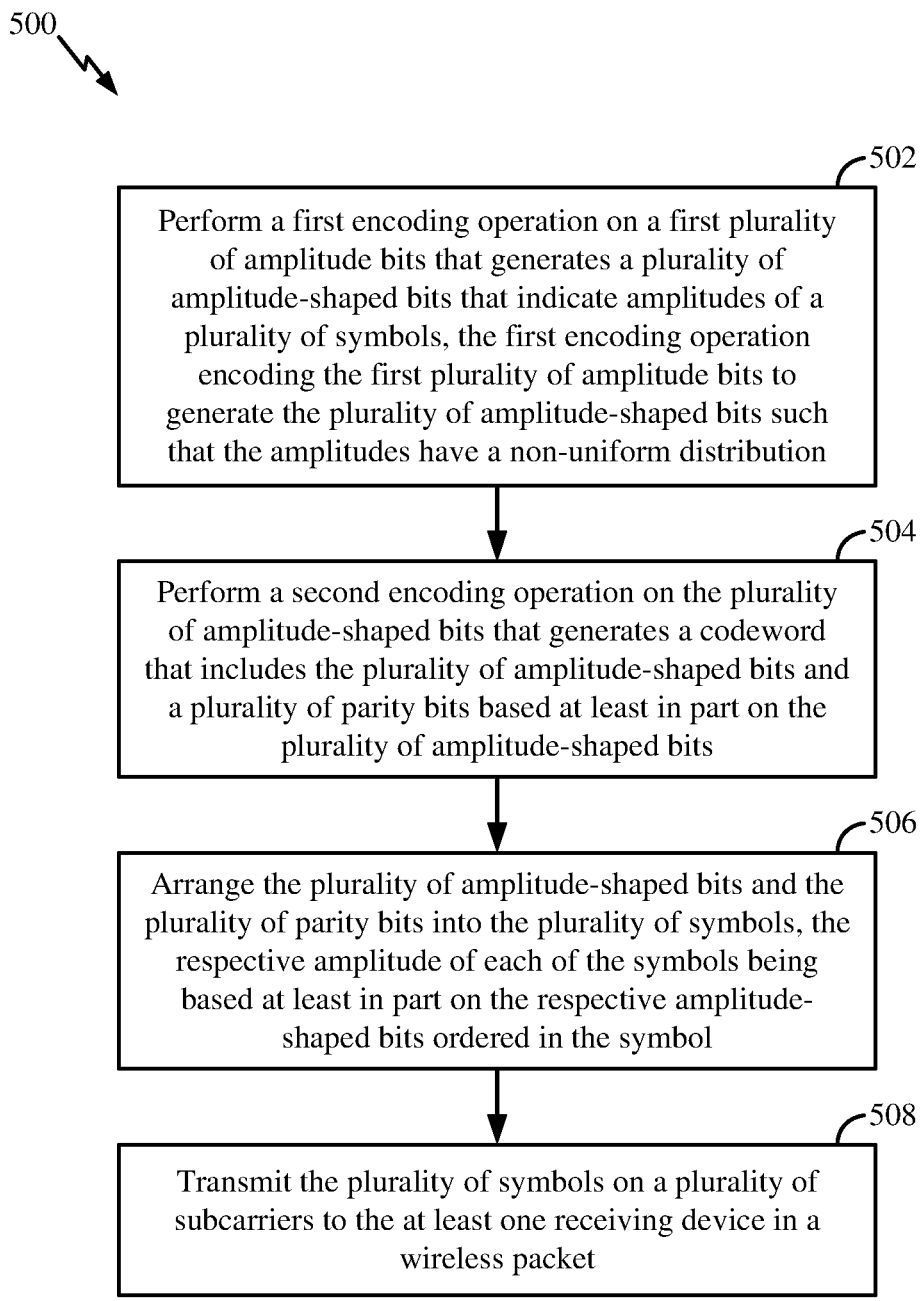
FIG. 5 shows a flowchart illustrating an example process for wireless communication that supports amplitude shaping according to some implementations.

FIG. 5 shows a flowchart illustrating an example process 500 for wireless communication that supports amplitude shaping according to some implementations. The operations of the process 500 may be implemented by a transmitting device or its components as described herein. For example, the process 500 may be performed by a wireless communication device such as the wireless communication device 300 described with reference to FIG. 3. In some implementations, the process 500 may be performed by a wireless communication device operating as or within an AP, such as one of the APs 102 and 402 described with reference to FIGS. 1 and 4A, respectively. In some other implementations, the process 500 may be performed by a wireless communication device operating as or within a STA, such as one of the STAs 104 and 404 described with reference to FIGS. 1 and 4B, respectively.

In block 502, the wireless communication device performs a first encoding operation on a plurality of amplitude bits that generates a plurality of amplitude-shaped bits that indicate amplitudes of a plurality of symbols. In some implementations, the first encoding operation encodes the plurality of amplitude bits to generate the plurality of amplitude-shaped bits such that the amplitudes have a non-uniform distribution. In block 504, the wireless communication device performs a second encoding operation on the plurality of amplitude-shaped bits that generates a codeword that includes the plurality of amplitude-shaped bits and a plurality of parity bits based at least in part on the plurality of amplitude-shaped bits. In block 506, the wireless communication device arranges the plurality of amplitude-shaped bits and the plurality of parity bits into the plurality of symbols, the respective amplitude of each of the symbols being based at least in part on the respective amplitude-shaped bits ordered in the symbol. In block 508, the wireless communication device transmits the plurality of symbols on a plurality of subcarriers to at least one receiving device in a wireless packet.

In some implementations, the performance of the first encoding operation (also referred to herein as an "amplitude-shaping encoding operation" or simply an "amplitude shaping operation") in block 502 encodes the plurality of amplitude bits to generate the plurality of amplitude-shaped bits such that the non-uniform distribution of the amplitudes of the symbols is a distribution in which the probabilities associated with the respective amplitudes generally increase with decreasing amplitude. For example, the non-uniform distribution may be approximately Gaussian centered around the center point (0,0) of the modulation constellation. As described above, such amplitude shaping may be used to increase the SNR and the channel capacity enabling greater throughput.

In some implementations, prior to performing the first encoding operation in block 502, a MAC layer of the wireless communication device generates an A-MPDU that includes a plurality of MPDUs. Each MPDU includes a plurality of data bits including a plurality of information bits (also referred to as "payload bits") as well as a plurality of control bits or a plurality of signaling bits (for example, MAC signaling bits). The first encoding operation may be performed in block 502 on all or a subset of the data bits in the MPDUs. For example, the information bits in each MPDU may be, or may include, a plurality of bits (amplitude bits) to be used for determining the amplitudes of the symbols. In some implementations, the first encoding operation may be performed in block 502 on only the amplitude bits. Additionally, in some implementations, to reduce complexity or because of the effective resultant coding rate, it may be sufficient or advantageous to perform the first encoding operation in block 502 on, for example, only the most significant bits (MSBs) of the amplitude bits (for example, if four bits are normally used to encode an amplitude component of a symbol, the number of MSBs may be three for each symbol). In such implementations, the first encoding operation is not performed on the remaining least significant bits (LSBs) of the amplitude bits.

Based on an MCS selected for transmission, the PHY layer may package the data bits in the MPDUs (either before or after performing the first encoding operation in block 502) into code blocks to be transmitted using M symbols. Each of the M symbols ultimately includes a set of n amplitude bits indicating at least one amplitude of the symbol. In some implementations, a first n/2 bits of the set of n amplitude bits for each symbol may indicate a first amplitude component of the amplitude of the symbol along a real axis of the modulation constellation, and a second n/2 bits of the set of n amplitude bits for each symbol of the M symbols may indicate a second amplitude component of the amplitude of the symbol along an imaginary axis of the modulation constellation. As such, there may be $2^{n/2}$ possible first amplitude levels for the first (real) amplitude component of each symbol, and $2^{n/2}$ possible second amplitude levels for the second (imaginary) amplitude component of each symbol.

Each of the M symbols may further include a sign bit for each of the amplitude components that indicates the sign of the respective amplitude. For example, when using QAM, a first sign bit of a pair of sign bits for each QAM symbol may indicate whether the respective first amplitude component along the real axis (the in-phase (i) component) is positive or negative, and the second sign bit of the pair of sign bits may indicate whether the respective second amplitude component along the imaginary axis (the quadrature (q) component) is positive or negative. As such, the first and the second amplitude components combine to provide the overall amplitude of the respective QAM symbol, and the first and the second sign bits combine to indicate the quadrant of the modulation constellation the overall amplitude lies in. For example, when using 1024-QAM, each symbol may include ten encoded bits in which a first four of the bits indicate the first (real) amplitude, another four of the bits indicate the second (imaginary) amplitude, another one of the bits indicates the sign (positive or negative) of the first amplitude, and another one of the bits indicates the sign (positive or negative) of the second amplitude.

Figure 6A:
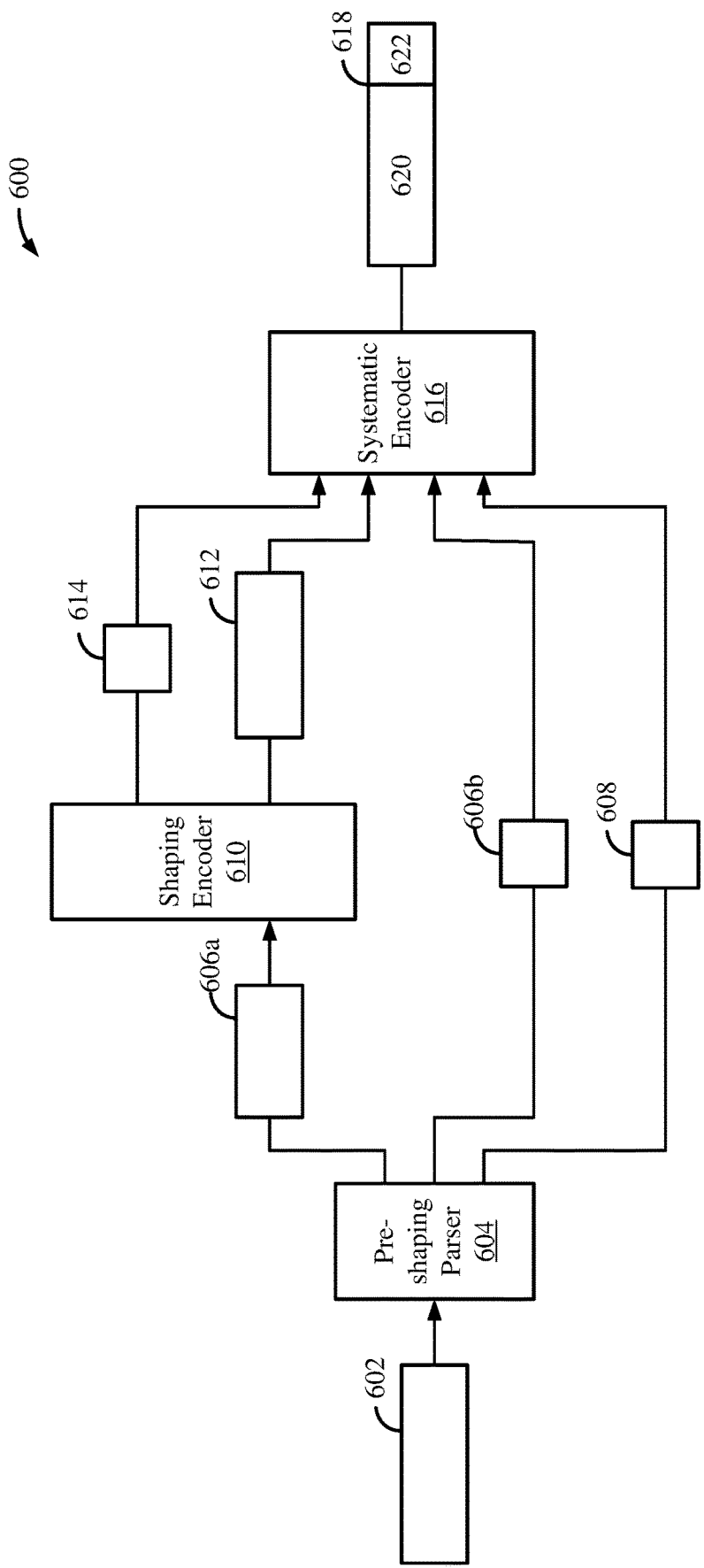
FIGS. 6A and 6B show a diagram of a flow that supports amplitude shaping according to some implementations.
Figure 6B:
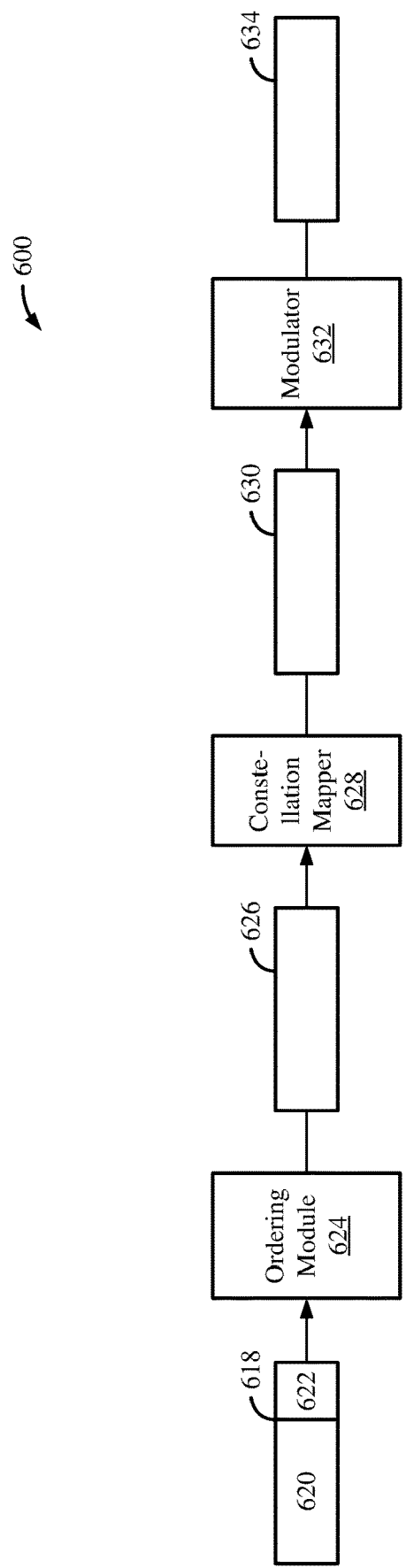

FIGS. 6A and 6B show a diagram of a flow 600 that supports amplitude shaping according to some implementations. For example, the flow 600 may illustrate aspects of the process 500. In the illustrated example, an information block 602 is provided to a pre-shaping parser 604 to obtain the plurality of amplitude bits on which a shaping encoder 610 will perform the first encoding operation in block 502. For example, the pre-shaping parser 604 may separate or divide amplitude bits 706 from sign bits 608 in the information block 602. In some implementations, the parser also separates or divides the amplitude bits into MSBs 606a and LSBs 606b. In some implementations, the plurality of amplitude bits provided to the shaping encoder 610 includes only the MSBs 606a of the amplitude bits 706. In some other implementations, the plurality of amplitude bits may include all of the amplitude bits 706. In the illustrated example, the shaping encoder 610 performs the first encoding operation on the MSBs 606a in block 502 to generate amplitude-shaped bits 612.

In some implementations, to perform the first encoding operation in block 502, and in particular, to obtain the set of n amplitude bits (eight in the 1024-QAM example) that indicate the first and the second amplitude components, the pre-shaping parser 604 (or the shaping encoder 610 itself) may further parse the plurality of amplitude bits (for example, the MSBs 606a) into a first stream of amplitude bits that will define the first amplitude components for the symbols when coded, and a second stream of amplitude bits that will define the second amplitude components for the symbols when coded. For example, in some implementations, a QAM flow is implemented via two independent pulse amplitude modulation (PAM) flows. In some such implementations, the shaping encoder 610 may perform the first encoding operation on the first stream of amplitude bits to provide a first PAM symbol stream in parallel with independently performing the first encoding operation on the second stream of amplitude bits to provide a second PAM symbol stream (which may ultimately be combined with the first PAM symbol stream to obtain a QAM symbol stream).

In some implementations, the performance of the first encoding operation in block 502 adds redundancy to the plurality of amplitude bits (the MSBs 606a in the example of FIGS. 6A and 6B) to generate the amplitude-shaped bits 612 such that the amplitude-shaped bits 612 include more bits than the plurality of amplitude bits input to the shaping encoder 610. By adding redundancy, the shaping encoder 610 may encode the MSBs 606a to generate the amplitude-shaped bits 612 such that the amplitudes of the associated symbols have a non-uniform distribution, and specifically, a distribution in which the probabilities associated with the respective amplitudes generally increase with decreasing amplitude, such as a Gaussian distribution.

In some implementations, the first encoding operation performed in block 502 is or includes a prefix encoding operation. In some such implementations, the performance of the prefix encoding operation in block 502 includes, for each symbol of the M symbols, and for each of the first (real) and second (imaginary) amplitude components, comparing one or more patterns of a set of $2^{b/2}$ patterns of bit values of various lengths to bits of the plurality of amplitude bits input to the shaping encoder 610. Again, in such implementations, b equals n if the plurality of amplitude bits provided to the shaping encoder 706 includes all of the data bits in the code block. However, if the plurality of amplitude bits comprises less than all of the data bits in the code block, for example, only the MSBs 606a of the amplitude bits 706, b may equal the number of MSBs of the n bits for each symbol. Each of the patterns in the set of patterns may be associated with a respective amplitude level of the $2^{b/2}$ possible first (real) amplitude levels or the $2^{b/2}$ possible second (imaginary) amplitude levels. In this way, each of the amplitude levels is associated with a respective probability of occurrence associated with a probability mass function. In some implementations, the set of patterns and associated probability mass function are based on a Huffman algorithm. In some implementations, the probability mass function is dyadic, that is, all probabilities in the probability mass function are a negative power of 2.

For example, the shaping encoder 610 may input bits of the plurality of amplitude bits (for example, the MSBs 606a) into a look-up table (LUT) that includes the set of patterns that implement the probability mass function. In some such implementations, the shaping encoder 610 includes a first LUT for determining the first (real) amplitude components for the first PAM symbol stream based on the first stream of amplitude bits, and a second LUT for determining the second (imaginary) components for the second PAM symbol stream based on the second stream of amplitude bits. The first and the second LUTs may initially be identical in some implementations; however, as described below, the first and the second LUTs may each be independently, dynamically-adjusted or switched-out for a more desirable LUT as the prefix encoding operation progresses in block 502.

FIG. 7 shows an example LUT 700 that supports amplitude shaping according to some implementations. In the illustrated example, the LUT 700 includes eight rows 702a-702h, each row indicating a pattern of bit values corresponding to a respective one of eight amplitude levels associated with a probability mass function. For example, a first row 702a associated with a first (lowest) amplitude level includes a first pattern of bit values 00 associated with a probability of occurrence of 1/4, a second row 702b associated with a second amplitude level includes a second pattern of bit values 01 associated with a probability of occurrence of 1/4, a third row 702c associated with a third amplitude level includes a third pattern of bit values 111 associated with a probability of occurrence of 1/8, a fourth row 702d associated with a fourth amplitude includes a fourth pattern of bit values 100 associated with a probability of occurrence of 1/8, a fifth row 702e associated with a fifth amplitude includes a fifth pattern of bit values 101 associated with a probability of occurrence of 1/8, a sixth row 702f associated with a sixth amplitude level includes a sixth pattern of bit values 1101 associated with a probability of occurrence of 1/16, a seventh row 702g associated with a seventh amplitude level includes a seventh pattern of bit values 11000 associated with a probability of occurrence of 1/32, and an eighth row 702h associated with an eighth (highest) amplitude level includes an eighth pattern of bit values 11001 associated with a probability of occurrence of 1/32.

In some implementations, the performance of the prefix encoding operation in block 502 further includes identifying a match between bits of the plurality of amplitude bits (for example, the MSBs 606a) and one of the patterns. For example, the shaping encoder 610 may compare consecutive bits of the plurality of amplitude bits to the patterns in the LUT 700. Generally, with each additional data bit that is input to the LUT 700 and matched, the number of possible matching patterns decreases until only one of the patterns is remaining, which is then selected by the shaping encoder 610. In other words, the shaping encoder 610 may, in block 502, compare numbers of next consecutive input bits of the respective stream of amplitude bits with one, some or all of the respective patterns in the LUT 700. For example, the shaping encoder 610 may compare the first two bits with one or both of the patterns in the rows 702a and 702b, the first three bits with one, two or all of the patterns in the rows 702c, 702d and 702e, the first four bits with the pattern in the row 702f, or the first five bits with one or both of the patterns in the rows 702g and 702h. Responsive to finding a match, the shaping encoder 610 may output a set of b/2 amplitude-shaped bits 612 for the respective PAM symbol indicating the amplitude level associated with the respective pattern. In some implementations, the shaping encoder 610 may generally output an average number of amplitude-shaped bits 612 per PAM symbol as defined in Equation (2) below.

$$\# \text{ of bits} = \sum_k -p_k \log_2 p_k$$

In Equation (2), $p_k$ is the probability associated with a respective number k of input data bits. For example, based on the probability mass function associated with the LUT 700, the number of amplitude-shaped bits 612 output per PAM symbol would be 2.6875 bits; that is, the effective coding rate to encode eight different amplitude levels would be reduced from the 3 typically required down to 2.6875 as a result of the amplitude shaping.

As described above, after performing the first encoding operation on the plurality of amplitude bits (for example, the MSBs 606a) in block 502 to generate the amplitude-shaped bits 612, a second encoding operation may then be performed on the amplitude-shaped bits 612 in block 504. For example, a second encoder 616 may receive a code block that includes the amplitude-shaped bits 612, and perform the second encoding operation in block 504 on the code block to generate a codeword 618 that includes a second plurality of coded data bits 620. In the illustrated example, the second encoder 616 performs the second encoding operation in block 504 on the amplitude-shaped bits 612 (based on the MSBs 606a) as well as on the LSBs 606b and the sign bits 608. Additionally, in implementations in which the shaping encoder generates signaling bits 614, such signaling bits may also be input to the second encoder 616 and encoded in the second encoding operation in block 504.

In some implementations, the second encoder 616 is a systematic encoder that performs a systematic encoding operation in block 504 such that the bits output from the second encoder 616 match those input to the second encoder. For example, in some such implementations, the second encoding operation performed is or includes a low-density parity check (LDPC) encoding operation (and as such, the second encoder 616 may hereinafter be referred to as the "LDPC encoder 616"). As such, the resultant second plurality of coded data bits 620 may include the amplitude-shaped bits 612, the LSBs 606b, the sign bits 608 and the signaling bits 614.

The performance of the LDPC encoding operation in block 504 adds redundancy to the data, for example, by generating a plurality of parity bits 622 based on the amplitude-shaped bits 612, the LSBs 606b, the sign bits 608 and the signaling bits 614. The parity bits 622 add redundancy to the data, for example, for forward error correction purposes, without changing the data. As such, for each code block input to the LDPC encoder 616, the resultant codeword 618 includes a systematic portion that contains the amplitude-shaped bits 612, the LSBs 606b, the sign bits 608 and the signaling bits 614 (collectively the second plurality of coded data bits 620), and a parity portion that contains the parity bits 622.

Upon performing the second encoding operation in block 504 to generate the codeword 618, the wireless communication device, in block 506, orders (or "arranges") the bits of the second plurality of coded data bits 620 and the plurality of parity bits 622 into M (for example, QAM) symbols 626 such that each symbol includes a set of n bits indicating an amplitude in the modulation constellation. For example, as shown in FIG. 6B, an ordering (or "reordering") module 624 may receive the codeword 618 and arrange bits from the amplitude-shaped bits 612, the LSBs 606b, the sign bits 608 and the parity bits 622 into the M symbols 626. In some such implementations, the ordering module 624 receives the amplitude-shaped bits 612, the LSBs 606b, the sign bits 608 and the parity bits 622 associated with both of the first and the second PAM symbol streams and reorders them into a single QAM symbol stream. In one 1024-QAM example in which each symbol 626 includes ten bits including n=8 amplitude bits of which b=6 are the MSBs, the ordering module 624 may take from the codeword 618, for each of the symbols 626, a set of three amplitude bits from the amplitude-shaped bits 612 encoded from the first stream of amplitude bits as well as an amplitude bit from the LSBs 606b associated with the first stream of amplitude bits in order to obtain the first (real) amplitude component. Similarly, the ordering module 624 may take from the codeword 618, for each of the symbols 626, a set of three amplitude bits from the amplitude-shaped bits 612 encoded from the second stream of amplitude bits as well as an amplitude bit from the LSBs 606b associated with the second stream of amplitude bits in order to obtain the second (imaginary) amplitude component.

As described above, each of the symbols 626 may further include a pair of sign bits indicating one of the four quadrants in the modulation constellation in which the amplitude is located. In some implementations, the ordering module 624 may attempt to take all of the sign bits needed for the symbols 626 from the parity bits 622. As described above, because the sign bits do not impact the power, it may be generally satisfactory to perform the amplitude shaping operation on only the amplitude bits 706, and in some implementations, only the MSBs 606a. For example, based on the selected MCS, the shaping encoder 610 is aware, on a code-block basis, how many parity bits will be generated by the LDPC encoder 616. As such, the shaping encoder 610 will know if some data bits will need to be used for sign bits in advance of the first encoding operation. For example, depending on the LDPC coding rate and QAM constellation size, it may be possible that all of the parity bits 622, as well as some unshaped data bits (for example, the sign bits 608), are used as sign bits in the symbols 626. This may be desirable because it means that the amplitudes of all of the M symbols 626 can be shaped. If dedicated sign bits 608 are necessary, they may be parsed from the rest of the code block prior to the first encoding operation and passed directly to the LDPC encoder 616 as described above. Alternatively, it may be possible that some parity bits 622 must be used as amplitude bits for the symbols 626 because the number of parity bits 622 is greater than the number of sign bits needed for the symbols 626. In such instances, the shaping encoder 610 may not be capable of performing the first encoding operation on, and thereby amplitude shaping, all amplitude components for all of the symbols 626 in block 502. As such, the achievable SNR gain may be reduced.

In block 508, the wireless communication device transmits the M symbols 626 on a plurality of subcarriers to the receiving device in a wireless packet. In some implementations, to transmit each of the symbols 626 in block 510, a constellation mapper (for example, a QAM mapper) 628 maps each of the symbols 626 to a point in a (for example, QAM) modulation constellation to obtain, for example, complex number representations 630 indicating the amplitudes and phases of the symbols 626. In some implementations, the constellation mapper 628 includes a plurality of constellation mappers, one for each of a plurality of streams of the symbols 626.

In some implementations, the ordering module 624 also may include a spatial stream parser that parses the symbols 626 into a plurality of spatial streams. In some such implementations, the spatial stream parser parses the amplitude-shaped bits 612, the LSBs 606b, the sign bits 608 and the parity bits 622 separately for each of the spatial streams to ensure that the bits are properly arranged into the symbols in the different spatial streams. In some implementations, the ordering module 624 additionally includes a plurality of bandwidth segment parsers that parse the symbols 626 from the spatial streams into different bandwidth segments (for example, different 80 MHz subchannels of a 160 MHz or 320 MHz bonded channel). After spatial stream parsing and bandwidth segment parsing (if performed), each of the different streams of parsed symbols 626 may be provided to a respective one of the constellation mappers that maps the symbols to points in the modulation constellation to obtain a respective stream of complex number representations 630.

A modulator 632 may then modulate the subcarriers of the bandwidth segments of the wireless channel based on the amplitudes and phases indicated by the complex number representations 630 to generate modulated symbols 634, which are then transmitted to the receiving device via coupled transmit chains and antennas. For example, continuing the example presented above, after the constellation mapping, the streams of complex number representations 630 may be provided to respective tone mappers of the modulator 632 that map the complex number representations to respective subcarriers (or "tones") of the wireless channel. In some implementations, the modulator 632 further includes a bandwidth segment deparser that deparses the different bandwidth segment streams to a plurality of spatial streams of symbols. The spatial streams may then be provided to a spatial multiplexer that performs spatial mapping on the symbols. The spatially-mapped streams may then be provided to a transform block that performs, for example, an inverse discrete Fourier transform on the symbols in the respective streams. The resultant symbols may then be provided to an analog and RF block for transmission. In some implementations, to ensure a uniform average transmission power, the analog and RF block may apply a power scaling factor to the modulated symbols 634 in block 508 prior to transmission over the wireless channel based on an amount of amplitude shaping performed in the first encoding operation.

In some implementations, the wireless communication device may generate the wireless packet in the form of a PPDU that includes a PHY layer preamble followed by a PSDU payload that contains the modulated symbols 634. The wireless communication device may transmit, or output for transmission (hereinafter used interchangeably with "transmit"), the wireless packet to the receiving device utilizing any suitable techniques including SU-MIMO, MU-MIMO and OFDMA techniques conforming to one or more of the IEEE 802.11 family of wireless communication protocol standards (such as that defined by the IEEE 802.11-2016 specification or amendments thereof including, but not limited to, 802.11ax and 802.11be). In some implementations, the wireless channel can be a 20 MHz, 40 MHz, 80 MHz, 160 MHz or 320 MHz channel including one or more contiguous or non-contiguous portions.

Figure 8:
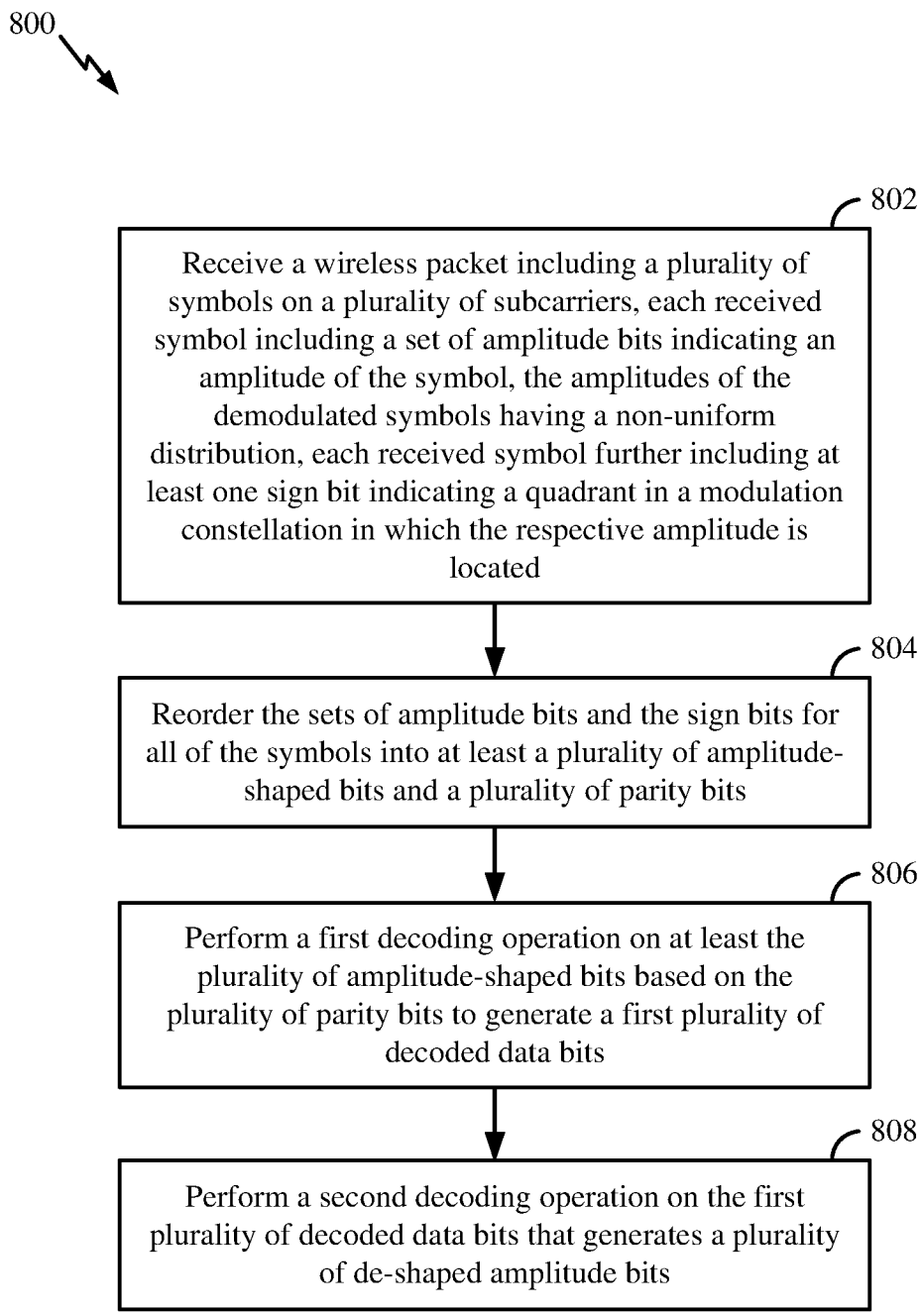
FIG. 8 shows a flowchart illustrating an example process for wireless communication that supports amplitude shaping according to some implementations.

FIG. 8 shows a flowchart illustrating an example process 800 for wireless communication that supports amplitude shaping according to some implementations. The operations of the process 800 may be implemented by a receiving device or its components as described herein. For example, the process 800 may be performed by a wireless communication device such as the wireless communication device 300 described with reference to FIG. 3. In some implementations, the process 800 may be performed by a wireless communication device operating as or within an AP, such as one of the APs 102 and 402 described with reference to FIGS. 1 and 4A, respectively. In some other implementations, the process 800 may be performed by a wireless communication device operating as or within a STA, such as one of the STAs 104 and 404 described with reference to FIGS. 1 and 4B, respectively.

In block 802, the wireless communication device receives a wireless packet including a plurality of modulated symbols on a plurality of subcarriers. Each received symbol includes a set of amplitude bits indicating an amplitude of the symbol. In some implementations, the amplitudes of the demodulated symbols have a non-uniform distribution. Each received symbol further includes at least one sign bit indicating a quadrant in a modulation constellation in which the respective amplitude is located. In block 804, the wireless communication device reorders the sets of amplitude bits and the sign bits for all of the symbols into at least a plurality of amplitude-shaped bits and a plurality of parity bits. In block 806, the wireless communication device performs a first decoding operation on at least the plurality of amplitude-shaped bits based on the plurality of parity bits to generate a first plurality of decoded data bits. In block 808, the wireless communication device performs a second decoding operation on the first plurality of decoded data bits that generates a plurality of de-shaped amplitude bits.

Figure 9A:
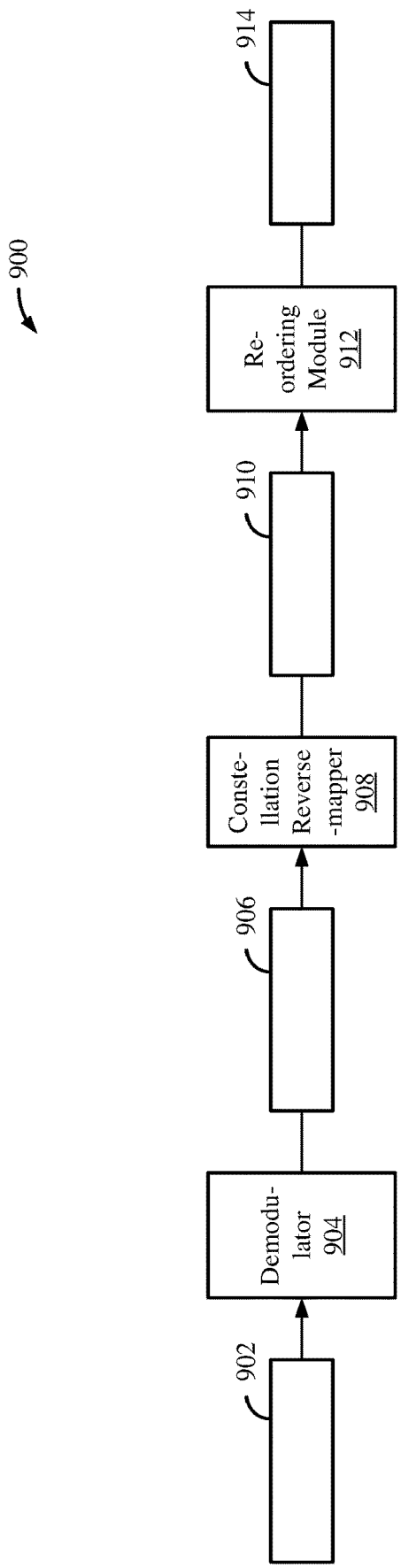
FIGS. 9A and 9B show a diagram of a flow that supports amplitude shaping according to some implementations.
Figure 9B:
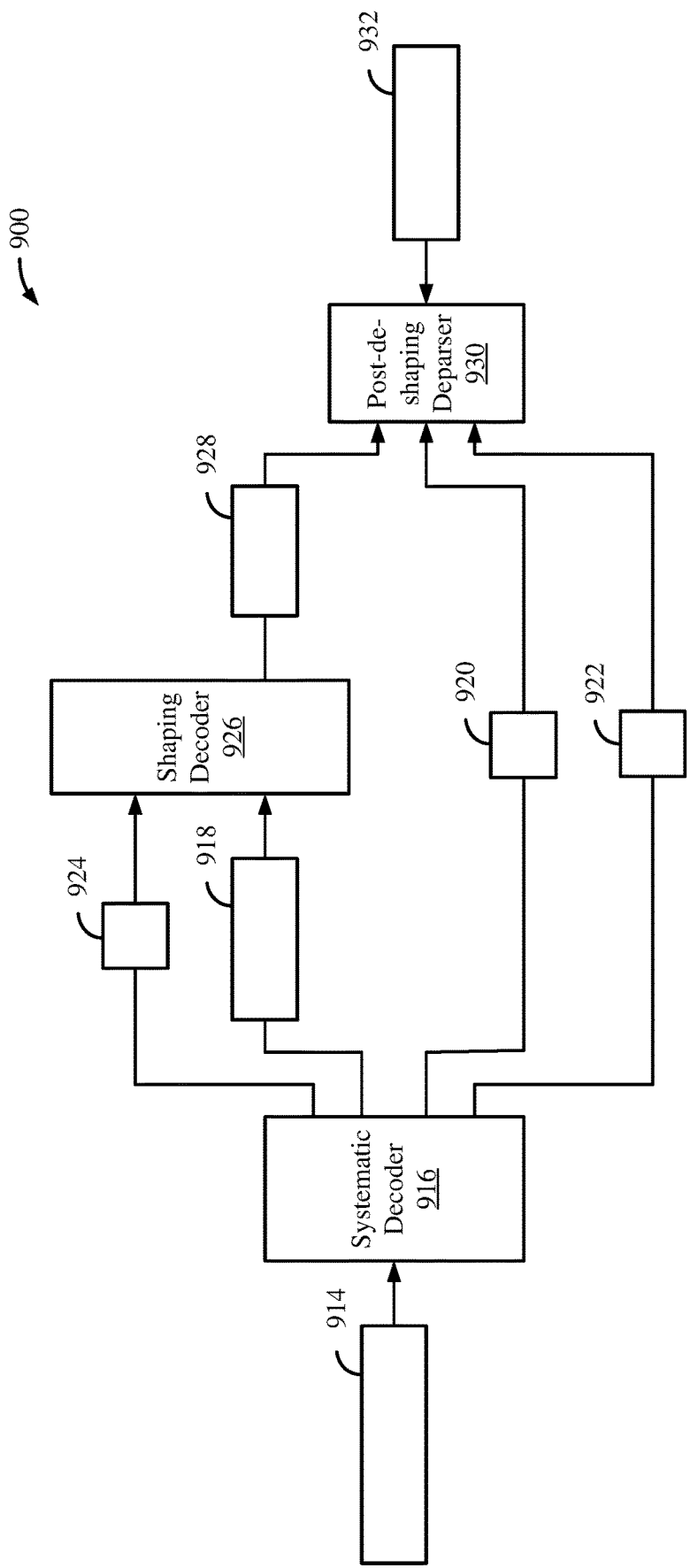

FIGS. 9A and 9B show a diagram of a flow 900 that supports amplitude shaping according to some implementations. For example, the flow 900 may illustrate aspects of the process 800. The process 800 and flow 900 are further presented below in relation to the process 500 and flow 600 described with reference to FIGS. 6-9. For example, in some implementations, the wireless communication device receives, in block 802, the wireless packet 902 including the plurality of modulated symbols 634 that were transmitted from the transmitting wireless communication device in block 508 of the process 500.

In some implementations, a demodulator 904 may receive the modulated symbols 634 via coupled antennas and receive chains and demodulate the subcarriers based on the detected amplitudes and phases in block 802 to generate demodulated symbols in the form of complex number representations 906 indicating the amplitudes and phases of the symbols, which are, ideally, identical to the complex number representations 630. For example, the demodulator 904 may include an analog and RF block that receives the wireless packet 902 and the modulated symbols over a plurality of spatial streams over a plurality of tones in one or more bandwidth segments via one or more coupled antennas. The received symbols may then be provided to a transform block of the demodulator 904 that performs, for example, a discrete Fourier transform on the symbols in the streams. In some implementations, the demodulator 632 further includes a bandwidth segment parser that parses the different bandwidth segment streams. A tone reverse-mapper of the demodulator 632 may then reverse-map the tones to obtain a plurality of spatial streams for each of the bandwidth segments (if present).

A constellation reverse-mapper (for example, a QAM reverse-mapper) 908 may then reverse map the complex number representations 906 from the respective points in the (for example, QAM) modulation constellation to obtain the demodulated symbols 910. For example, continuing the example presented above, the resultant streams of complex number representations 906 may be provided to respective constellation de-mappers that provide respective spatial streams of the demodulated symbols 910. Each of the demodulated symbols 910 ultimately includes a set of n amplitude bits indicating an amplitude of the symbol. As described above in conjunction with the process 500 and flow 600, a first n/2 bits of the set of n amplitude bits for each demodulated symbol 910 may indicate a first amplitude component of the amplitude of the symbol along a real axis of the modulation constellation, and a second n/2 bits of the set of n amplitude bits for each demodulated symbol 910 may indicate a second amplitude component of the amplitude of the symbol along an imaginary axis of the modulation constellation. As such, there are $2^{n/2}$ possible first amplitude levels for the first (real) amplitude component and $2^{n/2}$ possible second amplitude levels for the second (imaginary) amplitude component of each demodulated symbol 910. As described above, each of the demodulated symbols 910 may further include a sign bit for each of the amplitude components that indicates the sign of the respective amplitude.

As described above, in block 804, the wireless communication device reorders the sets of amplitude bits and the sign bits for all of the symbols into at least a plurality of amplitude-shaped bits and a plurality of parity bits. For example, the amplitude-shaped bits may include the MSBs 606a. In some such examples, the sets of amplitude bits may further include a plurality of unshaped bits, for example, including the LSBs 608. In some implementations, the demodulated symbols 910 may further include a plurality of sign bits or signaling bits. In some implementations, a reordering module 912 may receive the demodulated symbols 910 including all of the amplitude bits (including the amplitude-shaped bits and any unshaped bits) and the parity bits and reassemble them into a codeword 914. For example, continuing the example presented above, the reordering module 912 may also include a plurality of bandwidth segment deparsers that deparse the symbols 910 from the respective bandwidth segment streams. In some implementations, the reordering module 912 also may include a spatial stream deparser that deparses the symbols in the resultant spatial streams into a single stream of bits. As described above, the reordering module 912 may then reorder the bits from the demodulated symbols into the codeword 914.

As described above, in block 806, the wireless communication device performs a first decoding operation on at least the plurality of amplitude-shaped bits based on the plurality of parity bits to generate a first plurality of decoded data bits. For example, as shown in FIG. 9B, a first decoder 916 may receive the codeword 914 and perform the first decoding operation on the codeword 914 in block 808 to provide at least a first plurality of decoded data bits based on the amplitude-shaped bits. The first decoder 916 may be a systematic decoder (for example, an LDPC decoder) that attempts to decode the amplitude bits with the aid of the parity bits. As described above, the codeword 914 may also include unshaped amplitude bits (for example, LSBs or sign bits). As such, based on the decoding of the codeword 914, the first decoder 916 may output a decoded code block including decoded amplitude-shaped bits (for example, MSBs) 918, decoded LSBs 920, decoded sign bits 922 and decoded signaling bits 924.

As described above, the wireless communication device performs a second decoding operation in block 808 on the amplitude-shaped bits 918 to generate de-shaped amplitude bits. In some implementations, a shaping decoder 926 performs the second decoding operation (also referred to herein as the "amplitude de-shaping operation") to remove redundancy from the amplitude-shaped bits 918 to generate the de-shaped amplitude bits 928 such that the number (numerical quantity) of de-shaped amplitude bits 928 is less than the number of amplitude-shaped bits 918. In some implementations in which the plurality of decoded data bits includes unshaped bits (for examples, LSBs 920, sign bits 922 or signaling bits 924), the second decoding operation is performed on only the amplitude-shaped bits 918 in block 808. The amplitude de-shaping operation undoes the corresponding amplitude-shaping operation that was performed at the transmitting device such that the amplitudes associated with the respective symbols are reverted to a substantially uniform distribution.

In some implementations, the second decoding operation performed in block 808 is or includes a prefix decoding operation. For example, the shaping decoder 926 may perform a prefix decoding operation in block 808 that is essentially the inverse of the prefix encoding operation described with reference to block 502 of the process 500. As described above, in some implementations, the performance of the prefix decoding operation can be parallelized.

In the illustrated example, a deparser 930 reassembles the de-shaped bits (for example, the MSBs) 928 and any LSBs 920 or sign bits 922 into one or more information blocks 932. The information blocks 932 may then be processed by the MAC layer of the wireless communication device to decode corresponding MPDUs.

As described above, the amplitude-shaping encoding operation adds redundancy to the amplitude bits input to the shaping encoder, and specifically, such that the number of amplitude-shaped bits output from the shaping encoder is greater than the number of amplitude bits input to the shaping encoder. Because the amplitude-shaping encoding operation results in the encoding of fewer information bits to obtain the same number of symbols as that which may be achieved conventionally, the amplitude-shaping encoding operation results in a reduction of the effective coding rate of the MPDUs. Because the number of amplitude-shaped bits output from the shaping encoder may be content dependent (it depends on the values of the bits input to the shaping encoder), the effective coding rate of the shaping encoder may be intrinsically variable. Additionally, as described above, the number of amplitude-shaped bits output from the shaping encoder also may vary. For example, when using a prefix encoding operation to perform the amplitude shaping, the number of amplitude-shaped bits output from the shaping encoder may be variable.

The variable encoding rate of the prefix encoding operation causes the number of amplitude-shaped bits in a packet to vary depending on the input sequence of information bits. Having a variable packet length may lead to complications or undesirable consequences in the transmission or reception of wireless packets. For example, an error in a small portion of an MPDU may cause a bit-level boundary misalignment in other MPDUs. Additionally, the MAC layer must know the total number of payload bits (or APEP length) to determine the number of padding bits to be added to the information block to produce an integer number of symbols. In some implementations, the MAC layer may determine the packet length after performing the amplitude shaping operation and signal the packet length to the PHY layer. In some other implementations, the PHY layer may adjust the coding rate of the amplitude shaping operation to maintain a fixed rate.

Aspects of the present disclosure may further improve upon the integration of probabilistic amplitude shaping with existing versions of the IEEE 802.11 standard by combining a fixed pre-amplitude shaping information block length with a fixed post-amplitude shaping information block length. More specifically, in the present implementations, the packet length may be held to a fixed size without forcing the amplitude shaping operation to maintain a fixed coding rate. As used herein, the term "fixed" refers to a known quantity that does not change or vary across information blocks By maintaining fixed information block lengths before and after amplitude shaping, aspects of the present disclosure may enable the MAC layer to determine the number of padding bits to be added to the information block (to produce an integer number of symbols) without having to first perform the amplitude shaping operation. Further, by preserving the variable coding rate of the amplitude shaping operation, aspects of the present disclosure may support optimal encoding of the amplitude-shaped bits.

In some implementations, a transmitting device may achieve a fixed post-amplitude shaping information block length (N), at least in part, by placing a condition on the maximum payload length that can result from the amplitude shaping operation. More specifically, a shaping encoder may iteratively encode the information bits of the pre-amplitude shaping information block until the condition is met or exceeded. In other words, the amplitude shaping operation may cease or terminate if an additional iteration of the shaping operation would cause the number of amplitude-shaped bits combined with the number of unshaped bits to exceed the maximum payload length. In some aspects, the maximum payload length may be equal to N. If the resulting number of amplitude-shaped bits plus the number of unshaped bits is less than N, the transmitting device may add one or more padding bits to the post-amplitude shaping information block to satisfy the fixed block length requirement. In some implementations, the transmitting device may further add one or more signaling bits to the post-amplitude shaping information block to indicate, to a receiving device, the number of amplitude-shaped bits in the information block.

Figure 10:
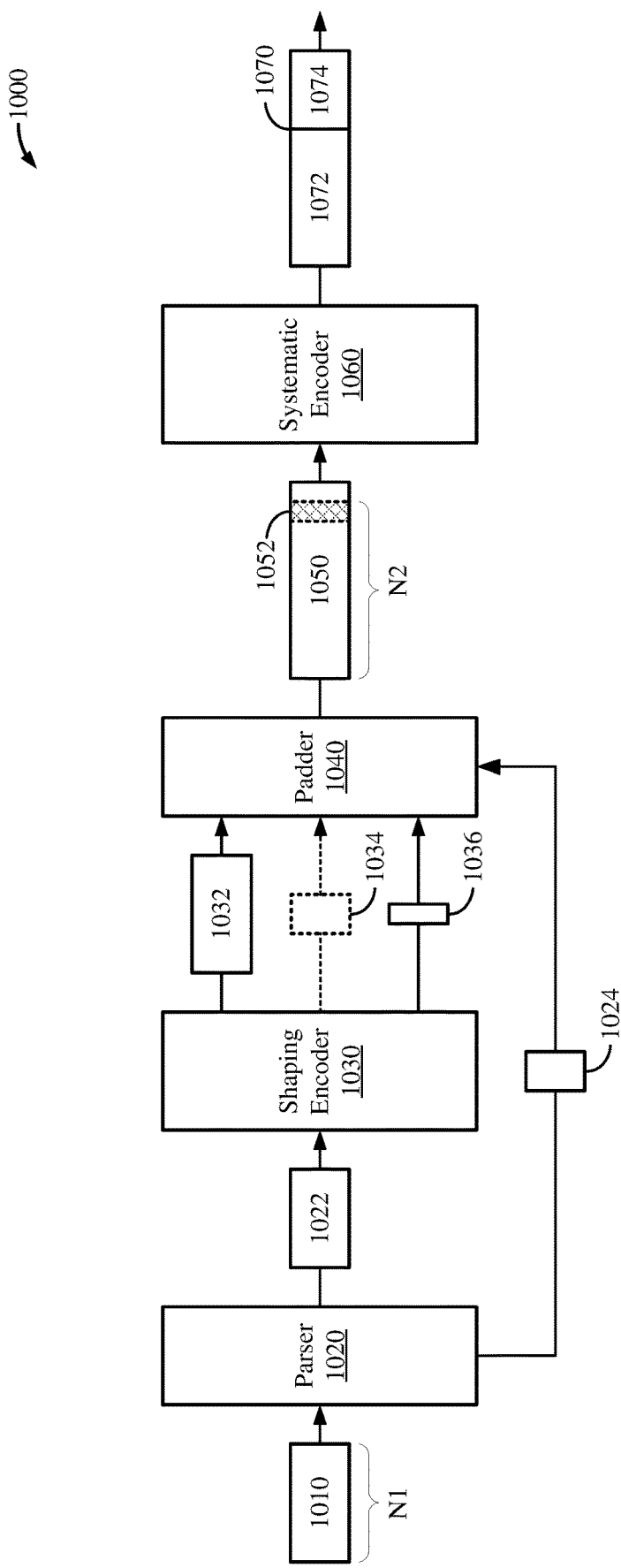
FIG. 10 shows another diagram of a flow that supports amplitude shaping according to some implementations.

FIG. 10 shows another diagram of a flow 1000 that supports amplitude shaping according to some implementations. For example, the flow 1000 may be another implementation of the flow 600 depicted in FIG. 6A. In the example of FIG. 10, an information block (also referred to as a pre-amplitude shaping information block) 1010 is provided as input to a parser 1020. In some implementations, the information block 1010 may have a fixed length (N1). Any wireless packet or PSDU may include one or multiple information blocks 1010 with length N1 by implementing the flow 1000.

The parser 1020 may be one example of the pre-shaping parser 604 of FIG. 6A. In some implementations, the parser 1020 may separate or divide the information block 1010 into a number of amplitude bits 1022 and a number of unshaped bits 1024. For example, the amplitude bits 1022 may correspond to MSB s of the information block 1010 and the unshaped bits 1024 may correspond to LSB s of the information block 1010. In some implementations, the parser 1020 may parse out a fixed number of unshaped bits 1024 to be used, for example, as sign bits in subsequent QAM mappings. The amplitude bits 1022 are provided to a shaping encoder 1030. The unshaped bits 1024 are provided directly to a padder 1040, bypassing the shaping encoder 1030.

The shaping encoder 1030 may be one example of the shaping encoder 610 of FIG. 6A. Thus, the shaping encoder 1030 may encode one or more of the amplitude bits 1022 to generate amplitude-shaped bits 1032 such that the amplitudes of the associated symbols have a non-uniform distribution. In some applications, the distribution may be one in which the probabilities associated with the respective amplitudes generally increase with decreasing amplitude (such as a Gaussian distribution). In some implementations, the shaping encoder 1010 is or includes a prefix encoder. As described above, the performance of a prefix encoding operation may include comparing sequences of consecutive amplitude bits 1022 to one or more patterns of bit values of a set of patterns of bit values having non-uniform lengths. The patterns of bit values may be defined such that each of the patterns of bit values has an associated probability of occurrence in the sequence of amplitude bits 1022 such that the patterns of bit values associated with relatively lower symbol amplitudes have relatively higher probabilities of occurrence than the patterns of bit values associated with relative higher symbol amplitudes.

Table 1 shows an example lookup table (LUT) that may be used by the shaping encoder 1030 to implement a prefix encoding operation configured for 4096 QAM. With reference for example to Table 1, there are 32 patterns of amplitude-shaped bits that may be output by the shaping encoder 1030. Each pattern of amplitude-shaped bits may consist of 5 bit values representing the magnitude of either the in-phase (I) component or the quadrature (Q) component of the amplitude of an associated symbol. Each pattern of amplitude-shaped bits is associated with a respective symbol amplitude. For example, there are 32 different possible patterns of amplitude-shaped bits and associated amplitude level values ranging from 1 to 63 (odd numbers only).

TABLE 1

| Input Sequence of Amplitude Bits | Output Sequence of Amplitude-Shaped Bits | Amplitude (I/Q Level) | Probability |
|---|---|---|---|
| 0011 | 10000 | 1 | 1/16 |
| 0000 | 10001 | 3 | 1/16 |
| 0001 | 10011 | 5 | 1/16 |
| 0110 | 10010 | 7 | 1/16 |
| 0111 | 10110 | 9 | 1/16 |
| 0100 | 10111 | 11 | 1/16 |
| 0101 | 10101 | 13 | 1/16 |
| 11001 | 10100 | 15 | 1/32 |
| 11110 | 11100 | 17 | 1/32 |
| 11111 | 11101 | 19 | 1/32 |
| 11100 | 11111 | 21 | 1/32 |
| 11101 | 11110 | 23 | 1/32 |
| 10010 | 11010 | 25 | 1/32 |
| 10011 | 11011 | 27 | 1/32 |
| 10000 | 11001 | 29 | 1/32 |
| 10001 | 11000 | 31 | 1/32 |
| 10110 | 01000 | 33 | 1/32 |
| 10111 | 01001 | 35 | 1/32 |
| 10100 | 01011 | 37 | 1/32 |
| 10101 | 01010 | 39 | 1/32 |
| 110110 | 01110 | 41 | 1/64 |
| 110111 | 01111 | 43 | 1/64 |
| 110100 | 01101 | 45 | 1/64 |
| 110101 | 01100 | 47 | 1/64 |
| 001010 | 00100 | 49 | 1/64 |
| 001011 | 00101 | 51 | 1/64 |
| 001000 | 00111 | 53 | 1/64 |
| 001001 | 00110 | 55 | 1/64 |
| 1100010 | 00010 | 57 | 1/128 |
| 1100011 | 00011 | 59 | 1/128 |
| 1100000 | 00001 | 61 | 1/128 |
| 1100001 | 00000 | 63 | 1/128 |

As shown in Table 1, there are 32 possible patterns of amplitude bits that may be input into the shaping encoder 1030. Each pattern of amplitude bits has a probability of occurrence associated with a probability mass function (PMF), where PMF=[8, 8, 8, 8, 8, 8, 8, 4, 4, 4, 4, 4, 4, 4, 4, 4, 4, 4, 4, 2, 2, 2, 2, 2, 2, 2, 1, 1, 1, 1]/128. With reference for example to Equation (2), the prefix encoding table above (Table 1) has an effective coding rate of 0.9500. However, the actual coding rate may vary depending on values of the amplitude bits 1022. For example, a 4-bit input sequence "0011" may be encoded as a 5-bit output sequence "10000," resulting in a coding rate less than 1. On the other hand, a 7-bit input sequence "1100001" may be encoded as a 5-bit output sequence "00000," resulting in a coding rate greater than 1. As described above, having a variable packet length may lead to complications or undesirable consequences in the transmission or reception of wireless packets.

In some implementations, the shaping encoder 1030 may iteratively encode the sequence of amplitude bits 1022 until the resulting number of payload bits (including the amplitude-shaped bits 1032, the unshaped bits 1024, and any remaining amplitude bits 1022 not yet encoded by the shaping encoder 1030) is greater than or equal to a maximum payload length (N2). More specifically, in each iteration, the shaping encoder 1030 selects another sequence of amplitude bits 1022 that matches a pattern of bit values in the prefix LUT and determines whether encoding the selected sequence of amplitude bits 1022 would cause the total number of payload bits to exceed the maximum payload length. In some implementations, if the additional iteration would cause the total number of payload bits to exceed the maximum payload length, the shaping encoder 1030 may cease or terminate the prefix encoding operation without encoding the selected sequence of amplitude bits 1022. In some other implementations, if the additional iteration of the prefix encoding operation would cause the total number of payload bits to exceed the maximum payload length, the shaping encoder 1030 may scan one or more additional bit values of the remaining amplitude bits 1022 to determine whether encoding another sequence of amplitude bits 1022 would cause the total number of payload bits to satisfy the maximum payload length requirement.

Figure 11:
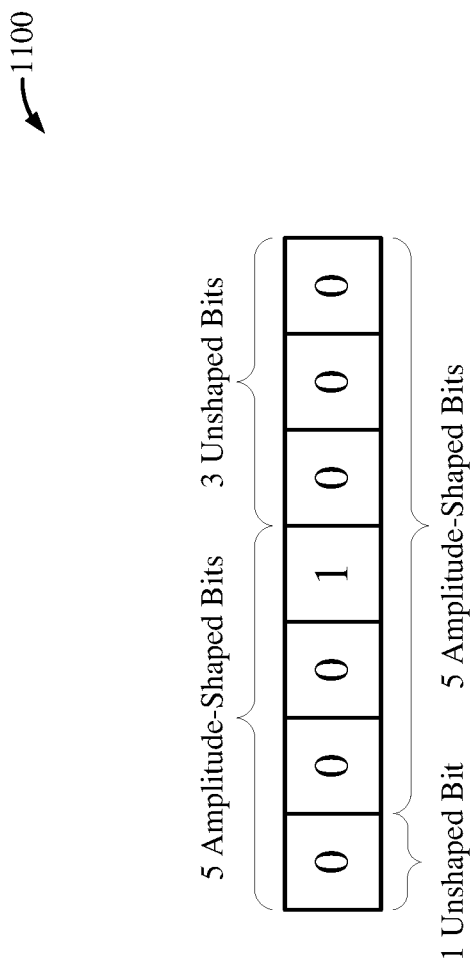
FIG. 11 shows an example sequence of amplitude bits that may be encoded using amplitude shaping according to some implementations.

FIG. 11 shows an example sequence of amplitude bits 1100 which may represent the next 7 bits ("0001000") provided as input to the shaping encoder 1030. Encoding the first 4 bits ("0001") of the sequence 1100 may produce 5 amplitude-shaped bits (corresponding to the output pattern "10011" in Table 1) while leaving 3 unshaped bits remaining. This results in a total of 8 payload bits being output by the shaping encoder 1030 responsive to the input sequence 1100. If the iterative encoding operation can only support an additional 7 payload bits before the maximum payload length is reached, the shaping encoder 1030 may not be able to encode the first 4 bits of the sequence 1100. However, encoding the last 6 bits ("001000") of the sequence 1100 may produce 5 amplitude-shaped bits (corresponding to the output pattern "00111" in Table 1) while leaving only 1 unshaped bit remaining. This results in only 6 payload bits being output by the shaping encoder 1030 responsive to the input sequence 1100. As a result, by scanning an additional 3 bits of the input sequence 1100, the shaping encoder 1030 may encode a greater number of amplitude-shaped bits while still conforming to the maximum payload length requirement.

At the conclusion or termination of the prefix encoding operation, the shaping encoder 1030 may provide the amplitude-shaped bits 1032 and any unshaped bits 1034 (corresponding to the remaining amplitude bits 1022 not encoded by the shaping encoder 1030) to the padder 1040. Additionally, the shaping encoder 1030 may output one or more signaling bits 1036 indicating a length or number of the amplitude-shaped bits 1032. In some implementations, the signaling bits 1036 may have a value representative of the number of amplitude-shaped bits 1032. In some other implementations, the value of the signaling bits 1036 may be compressed to reduce signaling overhead. As described above, a plurality of amplitude-shaped bits 1032 are used to represent the amplitude of a single PAM symbol. For example, for a 4096 QAM configuration, a codeword of length 1944 may be encoded using 324 PAM symbols. The number of shaped PAM symbols (or PAM symbols configured to have a non-uniform amplitude distribution) depends on the number of amplitude-shaped bits 1032 in the codeword. It is noted, however, that the number of shaped PAM symbols ($L_{PAM}$) will be less than the number of amplitude-shaped bits ($L_{US}$) from which they are encoded ($L_{PAM}<L_{US}$). In some implementations, the shaping encoder 1030 may determine a number ($L_{PAM}$) of shaped PAM symbols associated with the amplitude-shaped bits 1032 and may output one or more signaling bits 1036 having a value representative of $L_{PAM}$.

In some other implementations, the shaping encoder 1030 may determine a mean or average number ($L_{MEAN}$) of shaped PAM symbols that can be represented by the amplitude-shaped bits 1032 and may output one or more signaling bits 1036 having a value representative of the difference of $L_{PAM}$ and $L_{MEAN}$. To determine $L_{MEAN}$, the shaping encoder 1030 may first determine a mean number of amplitude-shaped bits encodable via a particular prefix encoding operation given N1 information bits. For example, the mean number of amplitude-shaped bits may correspond to the number of amplitude-shaped bits that can be encoded from N1 information (or amplitude) bits based on the effective coding rate of the prefix encoding table. The shaping encoder 1030 may then calculate $L_{MEAN}$ based on the number of PAM symbols associated with the mean number of amplitude-shaped bits.

In some other implementations, the shaping encoder 1030 may determine a maximum number ($L_{MAX}$) of shaped PAM symbols that can be represented by the amplitude-shaped bits 1032 and may output one or more signaling bits 1036 having a value representative of the difference of $L_{PAM}$ and $L_{MAX}$. To determine $L_{MAX}$, the shaping encoder 1030 may first determine a maximum number of amplitude-shaped bits encodable via a particular prefix encoding operation given N1 information bits. The shaping encoder 1030 may then calculate $L_{MAX}$ based on the number of PAM symbols associated with the maximum number of amplitude-shaped bits. Alternatively, the shaping encoder 1030 may determine the difference of $L_{PAM}$ and $L_{MAX}$ as the number of PAM symbols associated with the total number of unshaped bits (including the unshaped bits 1024 output by the parser 1020 and any unshaped bits 1034 output by the shaping encoder 1030).

In some other implementations, the shaping encoder 1030 may determine an estimated number ($L_{EST}$) of shaped PAM symbols associated with the amplitude-shaped bits 1032 based on a reverse-lookup of the prefix encoding table and may output one or more signaling bits 1036 having a value representative of the difference of $L_{PAM}$ and LEST. For example, the reverse-lookup of the prefix encoding table may correspond to a decoding operation performed on the payload bits (including the amplitude-shaped bits 1032, the unshaped bits 1024, and any additional unshaped bits 1034). To determine $L_{EST}$, the shaping encoder 1030 may first determine an estimated number of amplitude-shaped bits that can be decoded as a result of a prefix decoding operation performed on the payload bits, with the assumption that each of the payload bits may be provided as input to a corresponding prefix decoder. The shaping encoder 1030 may then calculate $L_{EST}$ based on the number of PAM symbols associated with the estimated number of amplitude-shaped bits.

Still further, in some implementations, the shaping encoder 1030 may determine a number of padding bits to be added to the payload bits to satisfy a particular condition and may output one or more signaling bits 1036 having a value representative of the number of padding bits. In some implementations, the padding bits may be added to bring the total number of payload bits up to the maximum payload length. Thus, shaping encoder 1030 may determine the number of padding bits as the number of bits short of the maximum payload length after summing the number of amplitude-shaped bits 1032, the number of unshaped bits 1024, and any remaining unshaped bits 1034. Because the payload bits have a fixed length (N2) and the unshaped bits 1024 also have a fixed length, the number of amplitude-shaped bits 1032 can be determined by subtracting the number of unshaped bits 1024 and the number of padding bits from the total number of payload bits.

The padder 1040 merges or combines the amplitude-shaped bits 1032, the unshaped bits 1024, and any remaining unshaped bits 1034 into a post-amplitude shaping information block 1050. In some implementations, the information block 1050 is configured to have a fixed length equal to the maximum payload length (N2). Thus, the padder 1040 may selectively add one or more padding bits 1052 to the information block 1050, as necessary, to achieve the maximum payload length. The padding bits 1052 may include all-zero values or repetitions of one or more payload bits. The padder 1040 may further add the signaling bits 1036 to the end of the information block 1050 (such as in the LSB bit positions). It is noted that, while the number of signaling bits 1036 may be a fixed amount, they may not be counted towards the maximum payload length (N2). In other words, the padder 1040 may ignore the signaling bits 1036 when determining how many (if any) padding bits 1052 to add to the information block 1050. The resulting post-amplitude shaping information block 1050 may be provided as input to a systematic encoder 1060.

The systematic encoder 1060 may be one example of the systematic encoder 616 of FIG. 6A. Thus, the systematic encoder 1060 may perform a systematic encoding operation on the information block 1050 such that the bits output from the systematic encoder 1060 match those input to the systematic encoder 1060. In some implementations, the systematic encoder 1060 is or includes an LDPC encoder. For each code block input to the systematic encoder 1060, the systematic encoder 1060 produces a codeword 1070 that includes a systematic portion 1072 and a parity portion 1074. The systematic portion 1072 includes the information block 1050. The parity portion 1074 includes a number of parity bits which add redundancy to, and may be used in the decoding of, the codeword 1070. The codeword 1070 may then be mapped to one or more QAM symbols, as described with respect to FIG. 6B. For example, the codeword 1070 may correspond to the codeword 618 input to the ordering module 624.

In some implementations, the systematic encoder 1060 may generate multiple codewords 1070 for a given packet. For example, the bits of the pre-amplitude shaping information block 1010 may be logically subdivided or partitioned across a number ($N_{CW}$) of codewords. Accordingly, the length of the information block 1010 may be a multiple (n1) of the codeword length (where $N1=n1*N_{CW}$). The bits of the post-amplitude shaping information block 1050 may be similarly encoded or distributed across the number of codewords. Thus, the length of the information block 1050 may be another multiple (n2) of the codeword length ($N2=n2*N_{CW}$). In this way, the flow 1000 may be used to generate multiple codewords for a single wireless packet while maintaining a fixed pre-amplitude shaping information block length (N1) and a fixed post-amplitude shaping information block length (N2).

Figure 12A:
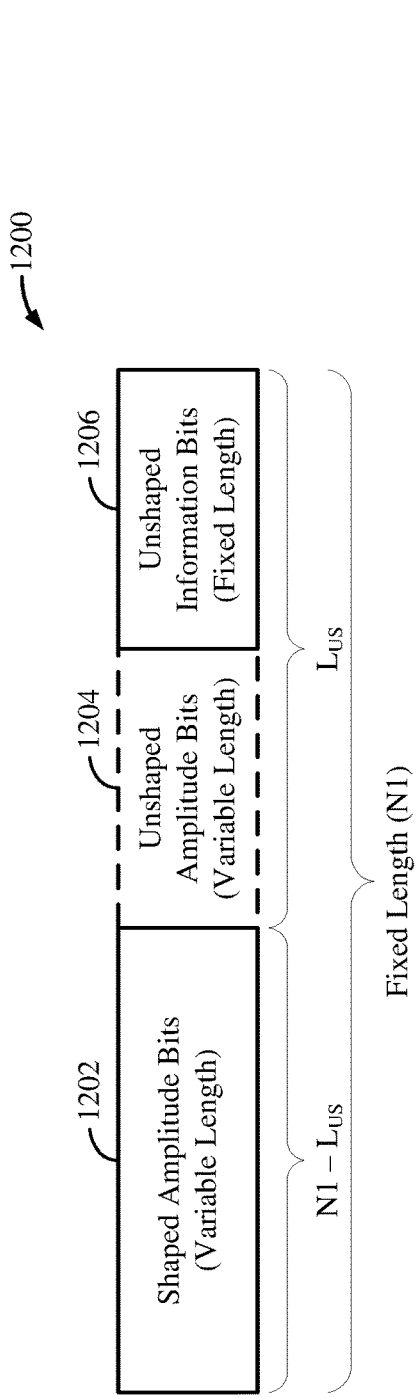
FIG. 12A shows an example pre-amplitude shaping information block according to some implementations.
Figure 12B:
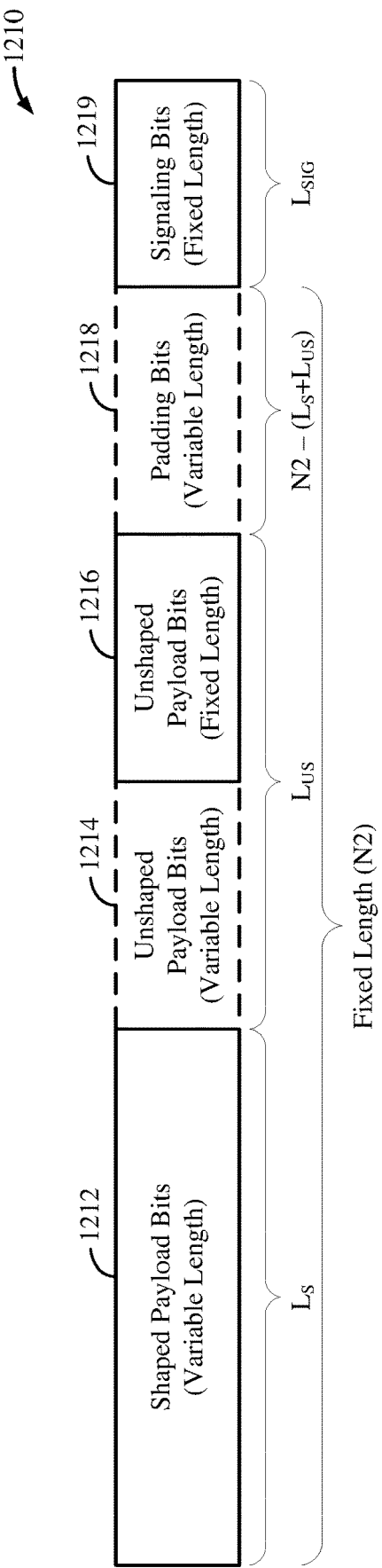
FIG. 12B shows an example post-amplitude shaping information block according to some implementations.

FIG. 12A shows an example pre-amplitude shaping information block 1200 according to some implementations. In some implementations, the information block 1200 may be one example of the pre-amplitude shaping information block 1010 of FIG. 10. The information block 1200 has a fixed length (N1) and includes a number of shaped amplitude bits 1202 and a number of unshaped information bits 1206. In some implementations, the information block 1200 also may include a number of unshaped amplitude bits 1204. FIG. 12B shows an example post-amplitude shaping information block 1210 according to some implementations. In some implementations, the information block 1210 may be one example of the post-amplitude shaping information block 1050 of FIG. 10. The information block 1210 has a fixed length and includes a number of shaped payload bits 1212, a number of unshaped payload bits 1216, and a number of signaling bits 1219. In some implementations, the information block 1210 also may include a number of additional unshaped payload bits 1214. In some other implementations, the information block 1210 also may include a number of padding bits 1218.

As described with respect to FIG. 10, the parser 1020 may separate the information block 1010 into a number of amplitude bits 1022 and a number of unshaped bits 1024. The unshaped bits 1024 may correspond to the unshaped information bits 1206 of the pre-amplitude shaping information block 1200 which, in turn, correspond to the unshaped payload bits 1216 of the post-amplitude shaping information block 1210. Thus, the unshaped information bits 1206 (and the unshaped payload bits 1216) may have a fixed length, for example, corresponding to a fixed number of LSB s of the information block 1200. The amplitude bits 1022 may include the shaped amplitude bits 1202 and the unshaped amplitude bits 1204 (if any) of the information block 1200. More specifically, the shaped amplitude bits 1202 may correspond to a subset of the amplitude bits 1022 that are encoded, by the shaping encoder 1030, into amplitude-shaped bits 1032. The amplitude-shaped bits 1032 may correspond to the shaped payload bits 1212 of the post-amplitude shaping information block 1210. The unshaped amplitude bits 1204 include any leftover amplitude bits 1022 not encoded by the shaping encoder 1030. More specifically, the unshaped amplitude bits 1204 may correspond to any unshaped bits 1034 output by the shaping encoder 1030. Thus, the unshaped amplitude bits 1204 may be passed directly to the post-amplitude shaping information block 1210, for example, as the additional unshaped payload bits 1214.

As described with respect to FIG. 10, the shaping encoder 1030 may iteratively encode the amplitude bits 1022 until the number of resulting payload bits reaches or exceeds a maximum payload length. The maximum payload length may correspond to a fixed length (N2) of a payload portion of the post-amplitude shaping information block 1210. As a result of this condition on the encoding operation, the shaped amplitude bits 1202 and unshaped amplitude bits 1204 may have variable lengths depending on the actual bit values of the amplitude bits 1022. Similarly, the shaped payload bits 1212 and additional unshaped payload bits 1214 also may have variable lengths. It is noted, however, that the number of unshaped amplitude bits 1204 translates directly to the number of additional unshaped payload bits 1214. Thus, the total number ($L_{US}$) of unshaped payload bits 1214 and 1216 in the post-amplitude shaping information block 1210 is equal to the sum of the number of unshaped amplitude bits 1204 and the number of unshaped information bits 1206 of the pre-amplitude shaping information block 1200. However, the number ($L_S$) of shaped payload bits 1212 of the post-amplitude shaping information block 1210 may be different than the number (N1–$L_{US}$) of shaped amplitude bits 1202 of the pre-amplitude shaping information block 1200.

As described with respect to FIG. 10, the padder 1040 may selectively add one or more padding bits 1052 to the post-amplitude shaping information block 1050 to satisfy the fixed length requirement. The padding bits 1052 may correspond to the padding bits 1218 of the post-amplitude shaping information block 1210. Thus, the padding bits 1218 may be added to the payload bits 1212-1216, if necessary, to increase the length of the payload portion of the post-amplitude shaping information block 1210 up to the fixed length (N2). More specifically, the padding bits 1218 may have a variable length equal to N2–($L_S$+$L_{US}$).

As described with respect to FIG. 10, the shaping encoder 1030 also may output one or more signaling bits 1036 indicating the number of amplitude-shaped bits 1032 in the post-amplitude shaping information block 1050. The signaling bits 1036 may correspond to the signaling bits 1039 of the post-amplitude shaping information block 1210. In some implementations, the signaling bits 1036 may have a fixed length ($L_{SIG}$) depending on the number of bit values needed to specify or otherwise indicate the maximum number of shaped payload bits 1212 that can be included in the information block 1210 (such as the value of N2 or the maximum value of $L_S$). In some aspects, the signaling bits 1219 may have a value representative of the number of shaped payload bits 1212. In some other aspects, one or more compression techniques may be used to reduce the number of signaling bits 1219 used to indicate the number of shaped payload bits 1212 (such as described with respect to FIG. 10).

Figure 13:
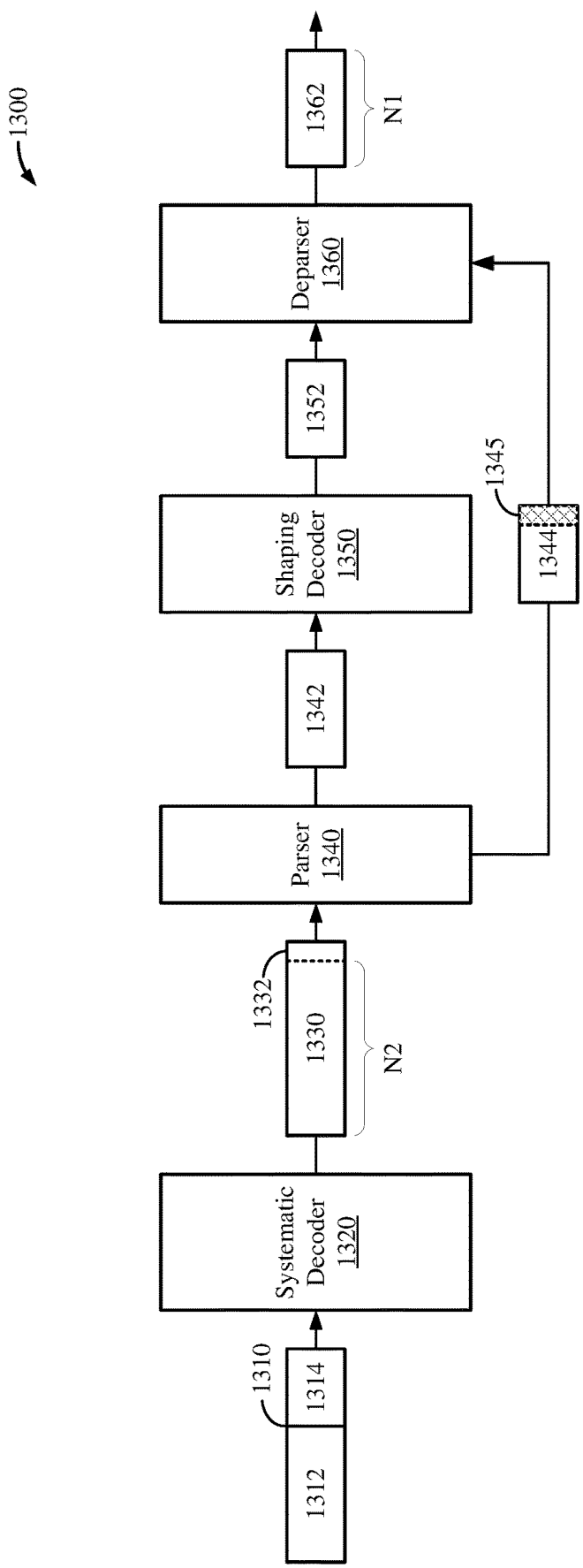
FIG. 13 shows another diagram of a flow that supports amplitude shaping according to some implementations.

FIG. 13 shows another diagram of a flow 1300 that supports amplitude shaping according to some implementations. For example, the flow 1300 may be another implementation of the flow 900 depicted in FIG. 9B. In the example of FIG. 13, a received codeword(s) 1310 is provided as input to a systematic decoder 1320. The codeword 1310 includes a systematic portion 1312 and a parity portion 1314. The codeword 1310 may be de-mapped from one or more QAM symbols, as described with respect to FIG. 9A. For example, the codeword 1310 may correspond to the codeword 914 output by the reordering module 912.

The systematic decoder 1320 may be one example of the systematic decoder 916 of FIG. 9B. Thus, the systematic decoder 1320 may perform a systematic decoding operation on the codeword 1310 such that bits output from the systematic decoder 1320 match those input to the systematic decoder 1320. More specifically, the systematic decoder 1320 may reverse or undo the systematic encoding performed by the systematic encoder 1060 of FIG. 10. In some implementations, the systematic decoder 1320 is or includes an LDPC decoder that attempts to decode or recover the bits of the systematic portion 1312 with the aid of the parity bits 1314. The decoded bits of the systematic portion 1312 may be output by the systematic decoder 1320 as an information block 1330. The information block 1330 may include a fixed number ($L_{SIG}$) of signaling bits 1332 used to indicate a number of amplitude-shaped bits included in the information block 1330. In some implementations, the information block 1330 may have a fixed length (N2+$L_{SIG}$), where N2 is the length of a payload portion of the information block 1330. The information block 1330 is provided as input to a parser 1340.

The parser 1340 may separate or divide the information block 1330 into a number of amplitude-shaped bits 1342 and a number of unshaped bits 1344. For example, the amplitude-shaped bits 1342 may correspond to MSBs of the information block 1330 and the unshaped bits 1344 may correspond to LSBs of the information block 1330. The parser 1340 may determine the number of amplitude-shaped bits 1342 to parse out of the information block 1330 based, at least in part, on a value of the signaling bits 1332. The amplitude-shaped bits 1342 are provided to a shaping decoder 1350. The remaining unshaped bits 1344 are provided directly to a deparser 1360, bypassing the shaping decoder 1350. In some implementations, the signaling bits 1332 may be included in the unshaped bits 1344 that are passed to the deparser 1360. In some other implementations, the parser 1340 may remove or discard the signaling bits 1332 after determining the length of the amplitude-shaped bits 1342.

In some implementations, the signaling bits 1332 may have a value representative of the number of amplitude-shaped bits 1342. In some other implementations, the value of the signaling bits 1332 may be compressed (such as described with respect to FIG. 10). For example, the signaling bits 1332 may have a value based, at least in part, on a number of PAM symbols associated with the amplitude-shaped bits 1342. In some implementations, the signaling bits 1332 may have a value representative of the number ($L_{PAM}$) of shaped PAM symbols associated with the amplitude-shaped bits 1342. Accordingly, the parser 1340 may determine the number of amplitude-shaped bits 1342 included in the information block 1330 based on the number of bits associated with $L_{PAM}$.

In some other implementations, the signaling bits 1332 may have a value representative of a difference between LPAM and a mean or average number ($L_{MEAN}$) of shaped PAM symbols that can be represented by the amplitude-shaped bits 1342. The parser 1340 may determine $L_{MEAN}$ by first determining a number of amplitude-shaped bits encodable via a particular prefix encoding operation given a fixed number (N1) of information bits. For example, $L_{MEAN}$ may correspond to the number of amplitude-shaped bits that can be encoded from N1 information bits based on the effective coding rate of the prefix encoding table. The parser 1340 may then calculate $L_{PAM}$ based on the difference between $L_{MEAN}$ and the value of the signaling bits 1332 and determine the number of amplitude-shaped bits 1342 included in the information block 1330 based on the number of bits associated with $L_{PAM}$.

In some other implementations, the signaling bits 1332 may have a value representative of a difference between $L_{PAM}$ and a maximum number ($L_{MAX}$) of shaped PAM symbols that can be represented by the amplitude-shaped bits 1342. The parser 1340 may determine $L_{MAX}$ by first determining a maximum number of amplitude-shaped bits encodable via a particular prefix encoding operation given N1 information bits. The parser 1340 may then calculate $L_{MAX}$ based on the number of PAM symbols associated with the maximum number of amplitude-shaped bits. The parser 1340 may further calculate $L_{PAM}$ based on the difference between $L_{MAX}$ and the value of the signaling bits 1332 and determine the number of amplitude-shaped bits 1342 included in the information block 1330 based on the number of bits associated with $L_{PAM}$.

In some other implementations, the signaling bits 1332 may have a value representative of a difference between $L_{PAM}$ and an estimated number ($L_{EST}$) of shaped PAM symbols associated with the amplitude-shaped bits 1342. The parser 1340 may determine $L_{EST}$ by first determining an estimated number of amplitude-shaped bits that can be decoded by the shaping decoder 1350 based on the N2 payload bits, with the assumption that each payload bit may be provided as input to the shaping decoder 1350. The parser 1340 may then calculate $L_{EST}$ based on the number of PAM symbols associated with the estimated number of amplitude-shaped bits. The parser 1340 may further calculate $L_{PAM}$ based on the difference between $L_{EST}$ and the value of the signaling bits 1332 and determine the number of amplitude-shaped bits 1342 included in the information block 1330 based on the number of bits associated with $L_{PAM}$.

Still further, in some implementations, the signaling bits 1332 may have a value representative of a number of padding bits included in the information block 1330. As described above, the payload portion of the information block 1330 has a fixed length (N2) and a number of unshaped payload bits in the information block 1330 is also fixed. Thus, the parser 1340 may determine the number of amplitude-shaped bits 1342 included in the information block 1330 by subtracting the number of padding bits and the fixed number of unshaped bits from the length of the payload portion of the information block 1330. As shown in FIG. 12B, after subtracting the number of padding bits 1218 and the number of unshaped payload bits 1216 from N2, the remaining bits may include some unshaped payload bits 1214 in addition to the shaped payload bits 1212. However, by applying the same conditions or restrictions on the prefix decoding operation as applied to the prefix encoding operation, the shaping decoder 1350 may perform amplitude de-shaping on only the shaped payload bits 1212. In other words, the unshaped payload bits 1214, even if provided to the shaping decoder 1350, may bypass the amplitude de-shaping operation.

The shaping decoder 1350 may be one example of the shaping decoder 926 of FIG. 9B. Thus, the shaping decoder 1350 may perform an amplitude de-shaping operation on the amplitude-shaped bits 1342 to recover a number of de-shaped bits 1352. More specifically, the shaping decoder 1350 may reverse or undo the amplitude shaping performed by the shaping encoder 1030 of FIG. 10. In some implementations, the shaping decoder 1350 is or includes a prefix decoder. For example, the shaping decoder 1350 may perform a prefix decoding operation that is essentially the inverse of the prefix encoding operation performed by the shaping encoder 1030 described with respect to FIG. 10. In some implementations, the shaping decoder 1350 may iteratively decode the amplitude-shaped bits 1342 until the resulting number of information bits (including the de-shaped bits 1352, the unshaped bits 1344, and any remaining amplitude-shaped bits 1342 not yet decoded by the shaping decoder 1350) is equal to a fixed amount (N1).

The deparser 1360 may be one example of the deparser 930 of FIG. 9B. In some implementations, the deparser 1360 may reassemble or combine the de-shaped bits 1352 and the unshaped bits 1344 (and any remaining amplitude-shaped bits 1342 not decoded by the shaping decoder 1350) into a decoded information block 1362 having a fixed length (N1). In some aspects, the unshaped bits 1344 may include one or more padding bits 1345. In some other aspects, the unshaped bits 1344 also may include the signaling bits 1332. The signaling bits 1332 and padding bits 1345 (if any) may correspond to LSBs of the decoded information block 1362 during the reassembly process. In some implementations, the deparser 1360 may remove any signaling bits 1332 or padding bits 1345 from the decoded information block 1362, for example, by reducing the length of the information block 1362 to N1. The decoded information block 1362 may then be processed by the MAC layer of a wireless communication device implementing the flow 1300 to decode corresponding MPDUs.

Figure 14:
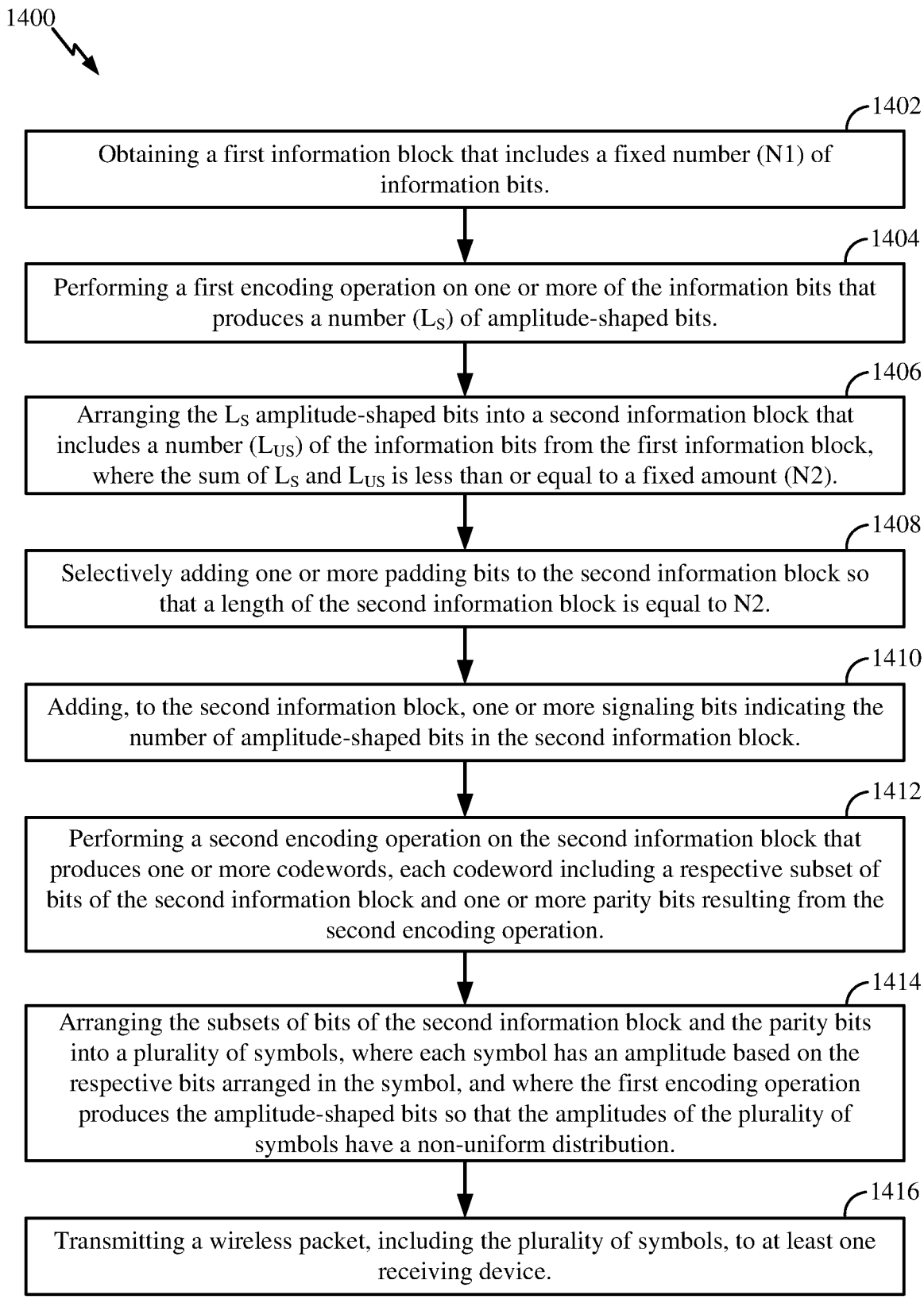
FIG. 14 shows a flowchart illustrating an example process for wireless communication that supports amplitude shaping according to some implementations.

FIG. 14 shows a flowchart illustrating an example process 1400 for wireless communication that supports amplitude shaping according to some implementations. In some implementations, the process 1400 may be performed by a wireless communication device operating as or within a network node, such as one of the STAs 104 or 404 described above with reference to FIGS. 1 and 4B, respectively. In some other implementations, the process 1400 may be performed by a wireless communication device operating as or within an AP, such as one of the APs 102 or 402 described above with reference to FIGS. 1 and 4A, respectively.

In some implementations, the process 1400 begins in block 1402 with obtaining a first information block that includes a fixed number (N1) of information bits. In block 1404, the process 1400 proceeds with performing a first encoding operation on one or more of the information bits that produces a number ($L_S$) of amplitude-shaped bits. In some implementations, the performing of the first encoding operation may include iteratively selecting, from a LUT, a pattern of bit values that matches a subset of the information bits, where the LUT stores a plurality of patterns of bit values corresponding to a respective plurality of patterns of amplitude-shaped bits, and where the plurality of patterns of amplitude-shaped bits includes the pattern of amplitude-shaped bits corresponding to the selected pattern of bit values. In some implementations, the iterative selecting of the pattern of bit values may further include determining, for each iteration, whether the selection of a first pattern of bit values matching a first subset of the information bits would cause the sum of $L_S$ and $L_{US}$ to be greater than N2.

In some implementations, the iterative selecting of the pattern of bit values may further include terminating the first encoding operation, without selecting the first pattern of bit values, responsive to determining that selecting the first pattern of bit values would cause the sum of $L_S$ and $L_{US}$ to be greater than N2. In some other implementations, the iterative selecting of the pattern of bit values may further include determining whether the selection of a second pattern of bit values matching a second subset of the information bits would cause the sum of $L_S$ and $L_{US}$ to be less than or equal to N2 responsive to determining that selecting the first pattern of bit values would cause the sum of $L_S$ and $L_{US}$ to be greater than N2. In some aspects, the second subset of the information bits may be larger than the first subset of the information bits. In some implementations, the iterative selecting of the pattern of bit values may further include responsive to determining that the resulting sum of $L_S$ and $L_{US}$ would be less than or equal N2; and terminating the first encoding operation responsive to selecting the second pattern of bit values.

In block 1406, the process 1400 proceeds with arranging the $L_S$ amplitude-shaped bits into a second information block that includes a number ($L_{US}$) of the information bits from the first information block, where the sum of $L_S$ and $L_{US}$ is less than or equal to a fixed amount (N2). In block 1408, the process 1400 proceeds with selectively adding one or more padding bits to the second information block so that a length of the second information block is equal to N2. In block 1410, the process 1400 proceeds with adding, to the second information block, one or more signaling bits indicating the number of amplitude-shaped bits in the second information block. In some implementations, the adding of the one or more signaling bits may include determining a number ($L_{PAM}$) of symbols associated with the amplitude-shaped bits; determining an estimated number of amplitude-shaped bits associated with the wireless packet based on a length of each pattern of amplitude-shaped bits in the LUT; and determining a number ($L_{EST}$) of symbols associated with the estimated number of amplitude-shaped bits, where the one or more signaling bits represents a value equal to the difference between $L_{PAM}$ and $L_{EST}$.

In some other implementations, the adding of the one or more signaling bits may include determining a number ($L_{PAM}$) of symbols associated with the amplitude-shaped bits, where the one or more signaling bits represents a value equal to $L_{PAM}$. In some other implementations, the adding of the one or more signaling bits may include determining a number ($L_{PAM}$) of symbols associated with the amplitude-shaped bits; determining a mean number of amplitude-shaped bits encodable based on the first encoding operation given N1 information bits; and determining a number ($L_{MEAN}$) of symbols associated with the mean number of amplitude-shaped bits, where the one or more signaling bits represents a value equal to the difference between $L_{PAM}$ and $L_{MEAN}$. In some other implementations, the adding of the one or more signaling bits may include determining a number of symbols associated with the information bits in the second information block, where the one or more signaling bits represents a value equal to the number of symbols associated with the information bits in the second information block. Still further, in some implementations, the one or more signaling bits may represent a value equal to a number of padding bits included in the second information block.

In block 1412, the process 1400 proceeds with performing a second encoding operation on the second information block that produces one or more codewords, where each codeword includes a respective subset bits of the second information block and one or more parity bits resulting from the second encoding operation. In block 1414, the process 1400 proceeds with arranging the subsets of bits of the second information block and the parity bits into a plurality of symbols, where each symbol has an amplitude based on the respective bits arranged in the symbol, where the first encoding operation produces the amplitude-shaped bits so that the amplitudes of the plurality of symbols have a non-uniform distribution. In block 1416, the process 1400 proceeds with transmitting a wireless packet, including the plurality of symbols, to at least one receiving device.

Figure 15:
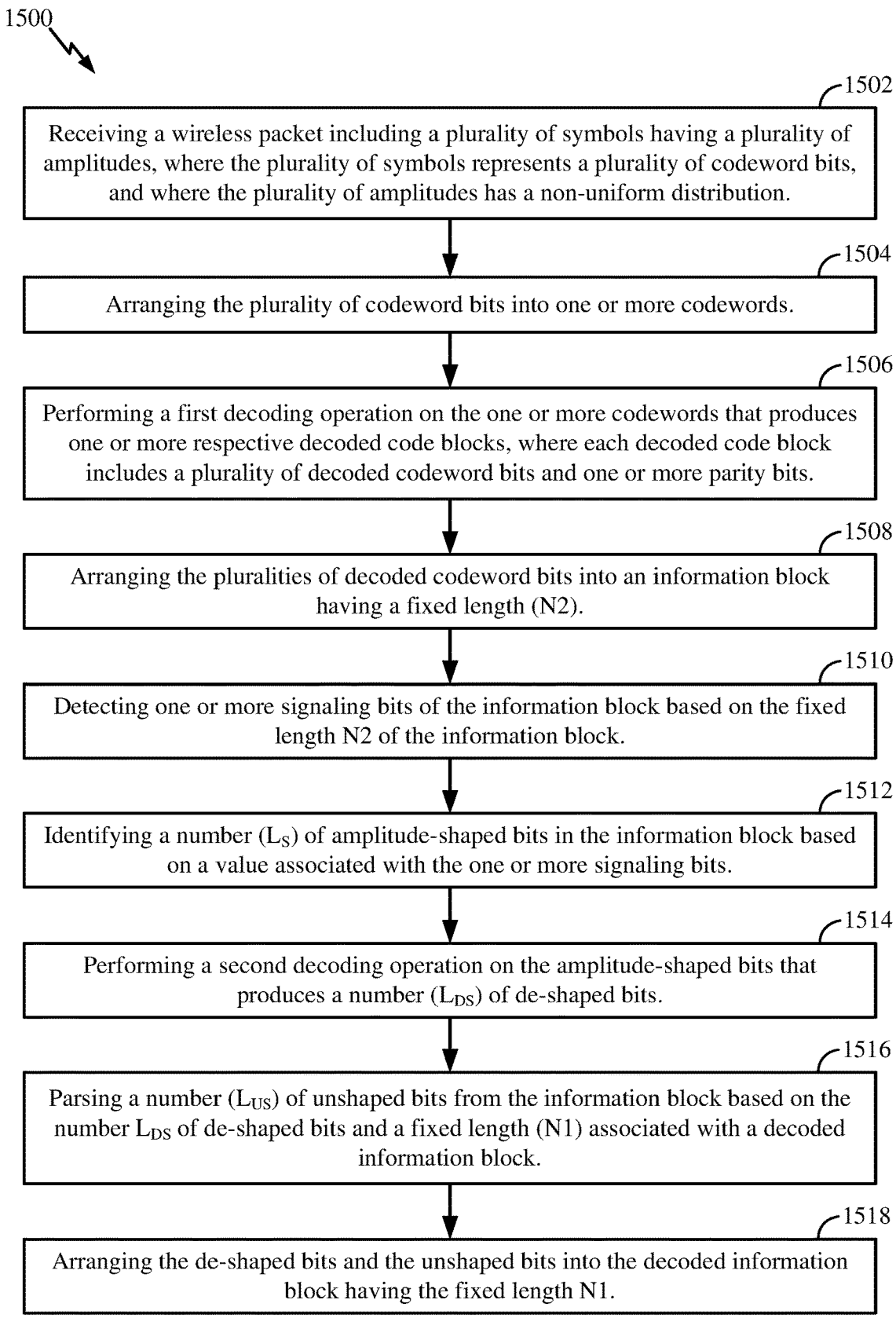
FIG. 15 shows a flowchart illustrating an example process for wireless communication that supports amplitude shaping according to some implementations.

FIG. 15 shows a flowchart illustrating an example process 1500 for wireless communication that supports amplitude shaping according to some implementations. In some implementations, the process 1500 may be performed by a wireless communication device operating as or within a network node, such as one of the STAs 104 or 504 described above with reference to FIGS. 1 and 5B, respectively. In some other implementations, the process 1500 may be performed by a wireless communication device operating as or within an AP, such as one of the APs 102 or 502 described above with reference to FIGS. 1 and 5A, respectively.

In some implementations, the process 1500 begins in block 1502 with receiving a wireless packet including a plurality of symbols having a plurality of amplitudes, where the plurality of symbols represents a plurality of codeword bits, and where the plurality of amplitudes has a non-uniform distribution. In block 1504, the process 1500 proceeds with arranging the plurality of codeword bits into one or more codewords. In block 1506, the process 1500 proceeds with performing a first decoding operation on the one or more codewords that produces one or more respective decoded code blocks, where each decoded code block includes a plurality of decoded codeword bits and one or more parity bits. In block 1508, the process 1500 proceeds with arranging the pluralities of decoded codeword bits into an information block having a fixed length (N2). In block 1510, the process 1500 proceeds with detecting one or more signaling bits of the information block based on the fixed length N2 of the information block.

In block 1512, the process 1500 proceeds with identifying a number ($L_S$) of amplitude-shaped bits in the information block based on a value associated with the one or more signaling bits. In some implementations, the amplitude-shaped bits may represent MSBs of the information block. In block 1514, the process 1500 proceeds with performing a second decoding operation on the amplitude-shaped bits that produces a number ($L_{DS}$) of de-shaped bits. In some implementations, the performing of the second decoding operation may include selecting, from an LUT, a pattern of de-shaped bits that matches a subset of the amplitude-shaped bits, where the LUT stores a plurality of patterns of de-shaped bits corresponding to a respective plurality of patterns of amplitude-shaped bits, and where the plurality of de-shaped bits includes the selected pattern of de-shaped bits.

In some implementations, the identifying of the number of amplitude-shaped bits may include determining an estimated number of amplitude-shaped bits associated with the wireless packet based on a length of each pattern of amplitude-shaped bits in the LUT; determining a number ($L_{EST}$) of symbols associated with the estimated number of amplitude-shaped bits; determining a number ($L_{PAM}$) of symbols associated with the amplitude-shaped bits based on a difference between $L_{EST}$ and the value associated with the one or more signaling bits; and determining the number of amplitude-shaped bits associated with $L_{PAM}$. In some other implementations, the identifying of the number of amplitude-shaped bits may include determining a number ($L_{PAM}$) of symbols associated with the amplitude-shaped bits based on the value associated with the one or more signaling bits; and determining the number of amplitude-shaped bits associated with $L_{PAM}$.

In some other implementations, the identifying of the number of amplitude-shaped bits may include determining a mean number of amplitude-shaped bits decodable based on the second decoding operation given N1 information bits; determining a number ($L_{MEAN}$) of symbols associated with the mean number of amplitude-shaped bits; determining a number ($L_{PAM}$) of symbols associated with the amplitude-shaped bits based on a difference between $L_{MEAN}$ and the value associated with the one or more signaling bits; and determining the number of amplitude-shaped bits associated with $L_{PAM}$. Still further, in some implementations, the identifying of the number of amplitude-shaped bits may include determining a number of padding bits included in the information block based on the value associated with the one or more signaling bits; and determining the number of amplitude-shaped bits based on N2, $L_{US}$, and the number of padding bits.

In block 1516, the process 1500 proceeds with parsing a number ($L_{US}$) of unshaped bits from the information block based on the number $L_{DS}$ of de-shaped bits and a fixed length (N1) associated with a decoded information block. In some implementations, the sum of $L_{US}$ and $L_{DS}$ may be equal to N2. In some implementations, one or more bits in excess of $L_{US}$ may be discarded from the information block. In some implementations, the discarded bits may represent LSBs of the information block. In block 1518, the process 1500 proceeds with arranging the de-shaped bits and the unshaped bits into the decoded information block having the fixed length N1.

Figure 16:
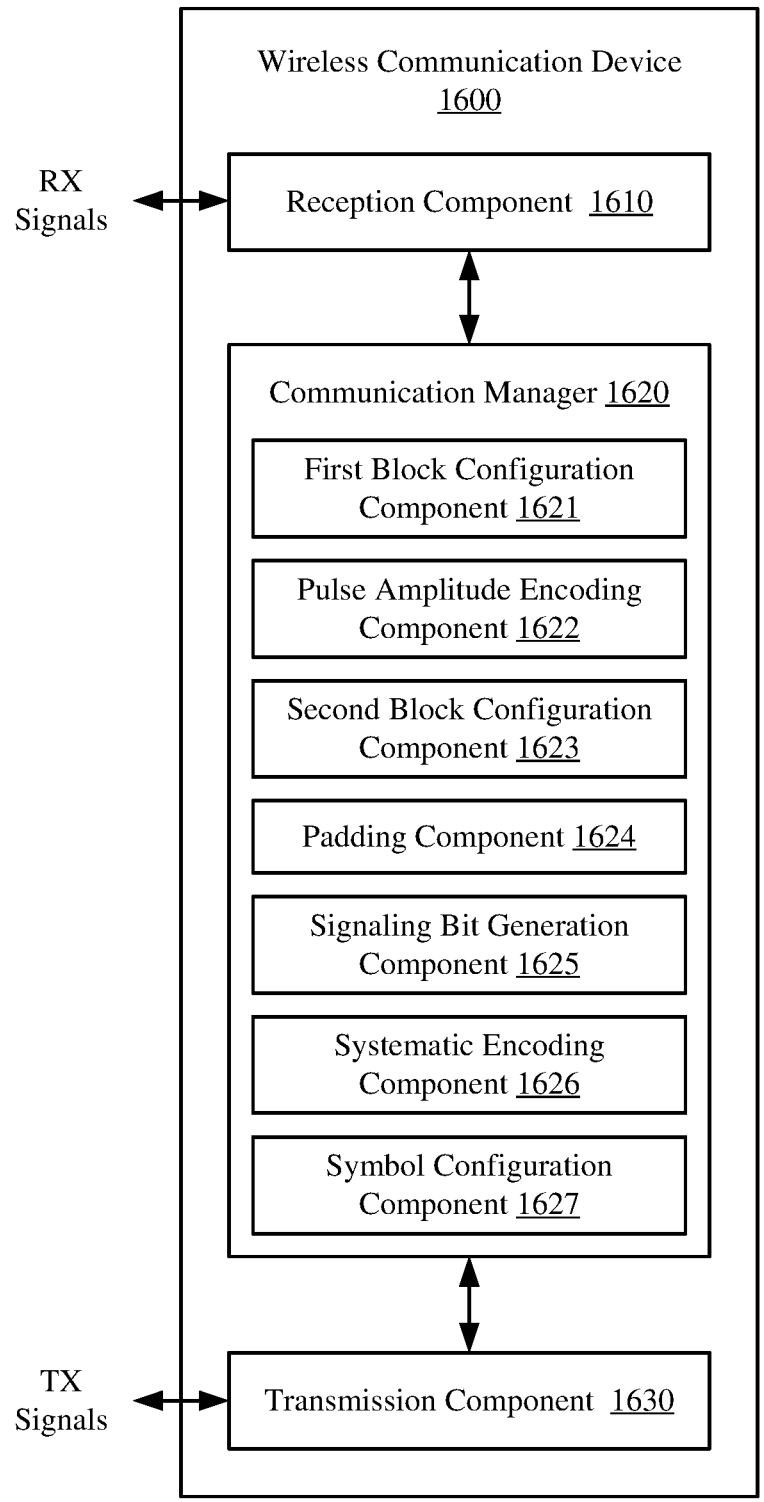
FIG. 16 shows a block diagram of an example wireless communication device according to some implementations

FIG. 16 shows a block diagram of an example wireless communication device 1600 according to some implementations. In some implementations, the wireless communication device 1600 is configured to perform the process 1400 described above with reference to FIG. 14. The wireless communication device 1600 can be an example implementation of the wireless communication device 300 described above with reference to FIG. 3. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 further includes a first block configuration component 1621, a pulse amplitude encoding component 1622, a second block configuration component 1623, a padding component 1624, a signaling bit generation component 1625, a systematic encoding component 1626, and a symbol configuration component 1627. Portions of one or more of the components 1621-1627 may be implemented at least in part in hardware or firmware. In some implementations, at least some of the components 1621-1627 are implemented at least in part as software stored in a memory (such as the memory 308). For example, portions of one or more of the components 1621-1627 can be implemented as non-transitory instructions (or "code") executable by a processor (such as the processor 306) to perform the functions or operations of the respective component.

The reception component 1610 is configured to receive RX signals, over a wireless channel, from one or more other wireless communication devices. The communication manager 1620 is configured to control or manage communications with the one or more other wireless communication devices. In some implementations, the first block configuration component 1621 may obtain a first information block that includes a fixed number (N1) of information bits; the pulse amplitude encoding component 1622 may perform a first encoding operation on one or more of the information bits that produces a number ($L_S$) of amplitude-shaped bits; the second block configuration component 1623 may arrange the $L_S$ amplitude-shaped bits into a second information block that includes a number ($L_{US}$) of the information bits from the first information block, where the sum of $L_S$ and $L_{US}$ is less than or equal to a fixed amount (N2); the padding component 1624 may selectively add one or more padding bits to the second information block so that a length of the second information block is equal to N2; the signaling bit generation component 1625 may add, to the second information block, one or more signaling bits indicating the number of amplitude-shaped bits in the second information block; the systematic encoding component 1626 may perform a second encoding operation on the second information block that produces one or more codewords, each codeword including a respective subset of bits of the second information block and one or more parity bits resulting from the second encoding operation; and the symbol configuration component 1627 may arrange the subsets of bits of the second information block and the parity bits into a plurality of symbols, where each symbol has an amplitude based on the respective bits arranged in the symbol, and where the first encoding operation produces the amplitude-shaped bits so that the amplitudes of the plurality of symbols have a non-uniform distribution. The transmission component 1630 is configured to transmit TX signals to the one or more other wireless communication devices. In some implementations the TX signals may represent a wireless packet that includes the plurality of symbols.

Figure 17:
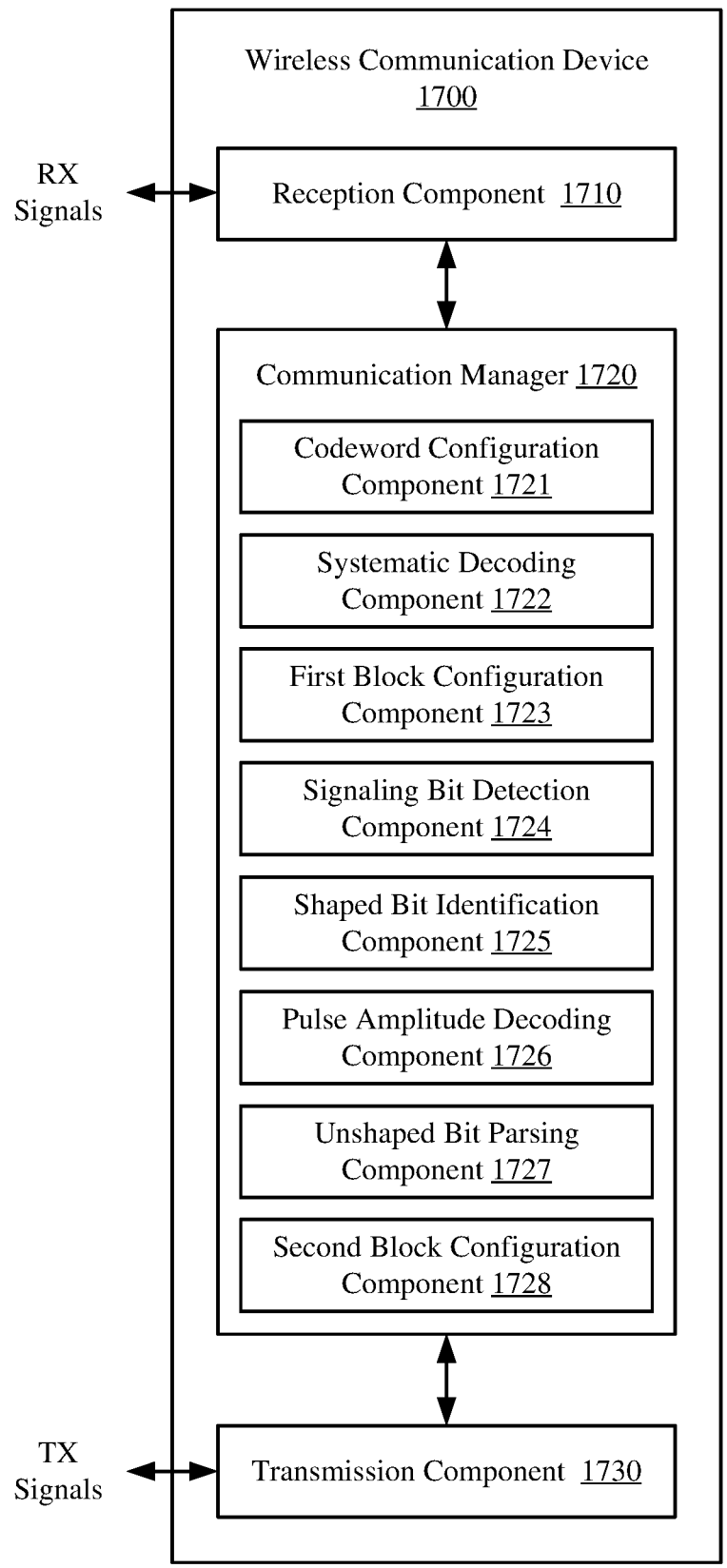
FIG. 17 shows a block diagram of an example wireless communication device according to some implementations Like reference numbers and designations in the various drawings indicate like elements.

FIG. 17 shows a block diagram of an example wireless communication device 1700 according to some implementations. In some implementations, the wireless communication device 1700 is configured to perform the process 1500 described above with reference to FIG. 15. The wireless communication device 1700 can be an example implementation of the wireless communication device 300 described above with reference to FIG. 3. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 further includes a codeword configuration component 1721, a systematic decoding component 1722, a first block configuration component 1723, a signaling bit detection component 1724, a shaped bit identification component 1725, a pulse amplitude decoding component 1726, an unshaped bit parsing component 1727, and a second block configuration component 1728. Portions of one or more of the components 1721-1728 may be implemented at least in part in hardware or firmware. In some implementations, at least some of the components 1721-1728 are implemented at least in part as software stored in a memory (such as the memory 308). For example, portions of one or more of the components 1721-1728 can be implemented as non-transitory instructions (or "code") executable by a processor (such as the processor 306) to perform the functions or operations of the respective component.

The reception component 1710 is configured to receive RX signals, over a wireless channel, from one or more other wireless communication devices. In some implementations, the RX signals may represent a wireless pack that includes a plurality of symbols having a plurality of amplitudes, where the plurality of symbols represents a plurality of codeword bits, and where the plurality of amplitudse have a non-uniform distribution. The communication manager 1720 is configured to control or manage communications with the one or more other wireless communication devices. In some implementations, the codeword configuration component 1721 may arrange the plurality of codeword bits into one or more codewords; the systematic decoding component 1722 may perform a first decoding operation on the one or more codewords that produces one or more respective decoded code blocks, where each decoded code block includes a plurality of decoded codeword bits and one or more parity bits; the first block configuration component 1723 may arrange the pluralities of decoded codeword bits into an information block having a fixed length (N2); the signaling bit detection component 1724 may detect one or more signaling bits of the information block based on the fixed length N2 of the information block; the shaped bit identification component 1725 may identify a number ($L_S$) of amplitude-shaped bits in the information block based on a value associated with the one or more signaling bits; the pulse amplitude decoding component 1726 may perform a second decoding operation on the amplitude-shaped bits that produces a number ($L_{DS}$) of de-shaped bits; the unshaped bit parsing component 1727 may parse a number ($L_{US}$) of unshaped bits from the information block based on the number $L_{DS}$ of de-shaped bits and a fixed length (N1) associated with a decoded information block; and the second block configuration component 1728 may arrange the de-shaped bits and the unshaped bits into the decoded information block having the fixed length N1. The transmission component 1730 is configured to transmit TX signals to the one or more other wireless communication devices.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Implementation examples are described in the following numbered clauses:

1. A method for wireless communication by a wireless communication device, including:

obtaining a first information block that includes a fixed number (N1) of information bits;

performing a first encoding operation on one or more of the information bits that produces a number ($L_S$) of amplitude-shaped bits;

arranging the $L_S$ amplitude-shaped bits into a second information block that includes a number ($L_{US}$) of the information bits from the first information block, the sum of $L_S$ and $L_{US}$ being less than or equal to a fixed amount (N2);

selectively adding one or more padding bits to the second information block so that a length of the second information block is equal to N2;

adding, to the second information block, one or more signaling bits indicating the number of amplitude-shaped bits in the second information block;

performing a second encoding operation on the second information block that produces one or more codewords, each codeword including a respective subset of bits of the second information block and one or more parity bits resulting from the second encoding operation;

arranging the subsets of bits of the second information block and the parity bits into a plurality of symbols, each symbol having an amplitude based on the respective bits arranged in the symbol, the first encoding operation producing the amplitude-shaped bits so that the amplitudes of the plurality of symbols have a non-uniform distribution; and transmitting a wireless packet, including the plurality of symbols, to at least one receiving device.

2. The method of clause 1, wherein the performing of the first encoding operation includes:

iteratively selecting, from a look-up table (LUT), a pattern of bit values that matches a subset of the information bits, the LUT storing a plurality of patterns of bit values corresponding to a respective plurality of patterns of amplitude-shaped bits, the plurality of patterns of amplitude-shaped bits including the pattern of amplitude-shaped bits corresponding to the selected pattern of bit values.

3. The method of any of clauses 1 or 2, wherein the iterative selecting of the pattern of bit values includes:
determining, for each iteration, whether the selection of a first pattern of bit values matching a first subset of the information bits would cause the sum of $L_S$ and $L_{US}$ to be greater than N2.

4. The method of any of clauses 1-3, wherein the iterative selecting of the pattern of bit values further includes:
terminating the first encoding operation, without selecting the first pattern of bit values, responsive to determining that selecting the first pattern of bit values would cause the sum of $L_S$ and $L_{US}$ to be greater than N2.

5. The method of any of clauses 1-3, wherein the iterative selecting of the pattern of bit values further includes:
determining whether the selection of a second pattern of bit values matching a second subset of the information bits would cause the sum of $L_S$ and $L_{US}$ to be less than or equal to N2 responsive to determining that selecting the first pattern of bit values would cause the sum of $L_S$ and $L_{US}$ to be greater than N2.

6. The method of any of clauses 1-3 or 5, wherein the second subset of the information bits is larger than the first subset of the information bits.

7. The method of any of clauses 1-3,5, or 6, wherein the iterative selecting of the pattern of bit values further includes:
selecting the second pattern of bit values, in lieu of the first pattern of bit values, responsive to determining that the resulting sum of $L_S$ and $L_{US}$ would be less than or equal N2; and
terminating the first encoding operation responsive to selecting the second pattern of bit values.

8. The method of any of clauses 1-7, wherein the adding of the one or more signaling bits includes:
determining a number ($L_{PAM}$) of symbols associated with the amplitude-shaped bits;
determining an estimated number of amplitude-shaped bits associated with the wireless packet based on a length of each pattern of amplitude-shaped bits in the LUT; and
determining a number ($L_{EST}$) of symbols associated with the estimated number of amplitude-shaped bits, the one or more signaling bits representing a value equal to the difference between $L_{PAM}$ and $L_{EST}$.

9. The method of any of clauses 1-7, wherein the adding of the one or more signaling bits includes:
determining a number ($L_{PAM}$) of symbols associated with the amplitude-shaped bits, the one or more signaling bits representing a value equal to $L_{PAM}$.

10. The method of any of clauses 1-7, wherein the adding of the one or more signaling bits includes:
determining a number ($L_{PAM}$) of symbols associated with the amplitude-shaped bits;
determining a mean number of amplitude-shaped bits encodable based on the first encoding operation given N1 information bits; and
determining a number (Lain) of symbols associated with the mean number of amplitude-shaped bits, the one or more signaling bits representing a value equal to the difference between $L_{PAM}$ and $L_{MEAN}$.

11. The method of any of clauses 1-7, wherein the adding of the one or more signaling bits includes:
determining a number of symbols associated with the information bits in the second information block, the one or more signaling bits representing a value equal to the number of symbols associated with the information bits in the second information block.

12. The method any of clauses 1-7, wherein the one or more signaling bits represent a value equal to a number of padding bits included in the second information block.

13. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 1-12.

14. A method for wireless communication by a wireless communication device, including:
receiving a wireless packet including a plurality of symbols having a plurality of amplitudes, the plurality of symbols representing a plurality of codeword bits, the plurality of amplitudes having a non-uniform distribution;
arranging the plurality of codeword bits into one or more codewords;
performing a first decoding operation on the one or more codewords that produces one or more respective decoded code blocks, each decoded code block including a plurality of decoded codeword bits and one or more parity bits;
arranging the pluralities of decoded codeword bits into an information block having a fixed length (N2);
detecting one or more signaling bits of the information block based on the fixed length N2 of the information block;
identifying a number ($L_S$) of amplitude-shaped bits in the information block based on a value associated with the one or more signaling bits;
performing a second decoding operation on the amplitude-shaped bits that produces a number ($L_{DS}$) of de-shaped bits;
parsing a number ($L_{US}$) of unshaped bits from the information block based on the number $L_{DS}$ of de-shaped bits and a fixed length (N1) associated with a decoded information block; and
arranging the de-shaped bits and the unshaped bits into the decoded information block having the fixed length N1.

15. The method of clause 14, wherein the amplitude-shaped bits represent most significant bits (MSBs) of the information block.

16. The method of any of clauses 14 or 15, wherein the sum of $L_{US}$ and $L_{DS}$ is equal to N2.

17. The method of any of clauses 14-16, further including:
discarding one or more bits of the information block in excess of $L_{US}$.

18. The method of any of clauses 14-17, wherein the discarded bits represent least significant bits (LSBs) of the information block.

19. The method of any of clauses 14-18, wherein the performing of the second decoding operation includes:

selecting, from a look-up table (LUT), a pattern of de-shaped bits that matches a subset of the amplitude-shaped bits, the LUT storing a plurality of patterns of de-shaped bits corresponding to a respective plurality of patterns of amplitude-shaped bits, the plurality of de-shaped bits including the selected pattern of de-shaped bits.

20. The method of any of clauses 14-19, wherein the identifying of the number of amplitude-shaped bits includes:

determining an estimated number of amplitude-shaped bits associated with the wireless packet based on a length of each pattern of amplitude-shaped bits in the LUT;

determining a number ($L_{EST}$) of symbols associated with the estimated number of amplitude-shaped bits;

determining a number ($L_{PAM}$) of symbols associated with the amplitude-shaped bits based on a difference between $L_{EST}$ and the value associated with the one or more signaling bits; and determining the number of amplitude-shaped bits associated with $L_{PAM}$.

21. The method of any of clauses 14-19, wherein the identifying of the number of amplitude-shaped bits includes:

determining a number ($L_{PAM}$) of symbols associated with the amplitude-shaped bits based on the value associated with the one or more signaling bits; and determining the number of amplitude-shaped bits associated with $L_{PAM}$.

22. The method of any of clauses 14-19, wherein the identifying of the number of amplitude-shaped bits includes:

determining a mean number of amplitude-shaped bits decodable based on the second decoding operation given N1 information bits;

determining a number ($L_{MEAN}$) of symbols associated with the mean number of amplitude-shaped bits;

determining a number ($L_{PAM}$) of symbols associated with the amplitude-shaped bits based on a difference between $L_{MEAN}$ and the value associated with the one or more signaling bits; and determining the number of amplitude-shaped bits associated with $L_{PAM}$.

23. The method of any of clauses 14-19, wherein the identifying of the number of amplitude-shaped bits includes:

determining a number of padding bits included in the information block based on the value associated with the one or more signaling bits; and determining the number of amplitude-shaped bits based on N2, $L_{US}$, and the number of padding bits.

24. A wireless communication device including:
at least one modem;
at least one processor communicatively coupled with the at least one modem; and
at least one memory communicatively coupled with the at least one processor and storing processor-readable code that, when executed by the at least one processor in conjunction with the at least one modem, is configured to perform the method of any one or more of clauses 14-23.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:

obtaining a first information block that includes a fixed number (N1) of information bits;

performing a first encoding operation on one or more of the information bits that produces a number ($L_S$) of amplitude-shaped bits;

arranging the $L_S$ amplitude-shaped bits into a second information block that includes a number ($L_{US}$) of the information bits from the first information block, the sum of $L_S$ and $L_{US}$ being less than or equal to a fixed amount (N2);

selectively adding one or more padding bits to the second information block so that a length of the second information block is equal to N2;

adding, to the second information block, one or more signaling bits indicating the number of amplitude-shaped bits in the second information block;

performing a second encoding operation on the second information block that produces one or more codewords, each codeword including a respective subset of bits of the second information block and one or more parity bits resulting from the second encoding operation;

arranging the subsets of bits of the second information block and the parity bits into a plurality of symbols, each symbol having an amplitude based on the respective bits arranged in the symbol, the first encoding operation producing the amplitude-shaped bits so that the amplitudes of the plurality of symbols have a non-uniform distribution; and transmitting a wireless packet, including the plurality of symbols, to at least one receiving device.

2. The method of claim 1, wherein the performing of the first encoding operation comprises:

iteratively selecting, from a look-up table (LUT), a pattern of bit values that matches a subset of the information bits, the LUT storing a plurality of patterns of bit values corresponding to a respective plurality of patterns of amplitude-shaped bits, the plurality of patterns of amplitude-shaped bits including the pattern of amplitude-shaped bits corresponding to the selected pattern of bit values.

3. The method of claim 2, wherein the iterative selecting of the pattern of bit values comprises:

determining, for each iteration, whether the selection of a first pattern of bit values matching a first subset of the information bits would cause the sum of $L_S$ and $L_{US}$ to be greater than N2.

4. The method of claim 3, wherein the iterative selecting of the pattern of bit values further comprises:

terminating the first encoding operation, without selecting the first pattern of bit values, responsive to determining that selecting the first pattern of bit values would cause the sum of $L_S$ and $L_{US}$ to be greater than N2.

5. The method of claim 3, wherein the iterative selecting of the pattern of bit values further comprises:

determining whether the selection of a second pattern of bit values matching a second subset of the information bits would cause the sum of $L_S$ and $L_{US}$ to be less than or equal to N2 responsive to determining that selecting the first pattern of bit values would cause the sum of $L_S$ and $L_{US}$ to be greater than N2.

6. The method of claim 5, wherein the second subset of the information bits is larger than the first subset of the information bits.

7. The method of claim 5, wherein the iterative selecting of the pattern of bit values further comprises:

selecting the second pattern of bit values, in lieu of the first pattern of bit values, responsive to determining that the resulting sum of $L_S$ and $L_{US}$ would be less than or equal N2; and terminating the first encoding operation responsive to selecting the second pattern of bit values.

8. The method of claim 2, wherein the adding of the one or more signaling bits comprises:

determining a number ($L_{PAM}$) of symbols associated with the amplitude-shaped bits;

determining an estimated number of amplitude-shaped bits associated with the wireless packet based on a length of each pattern of amplitude-shaped bits in the LUT; and determining a number ($L_{EST}$) of symbols associated with the estimated number of amplitude-shaped bits, the one or more signaling bits representing a value equal to the difference between $L_{PAM}$ and $L_{EST}$.

9. The method of claim 1, wherein the adding of the one or more signaling bits comprises:

determining a number ($L_{PAM}$) of symbols associated with the amplitude-shaped bits, the one or more signaling bits representing a value equal to $L_{PAM}$.

10. The method of claim 1, wherein the adding of the one or more signaling bits comprises:

determining a number ($L_{PAM}$) of symbols associated with the amplitude-shaped bits;

determining a mean number of amplitude-shaped bits encodable based on the first encoding operation given N1 information bits; and determining a number ($L_{MEAN}$) of symbols associated with the mean number of amplitude-shaped bits, the one or more signaling bits representing a value equal to the difference between $L_{PAM}$ and $L_{MEAN}$.

11. The method of claim 1, wherein the adding of the one or more signaling bits comprises:

determining a number of symbols associated with the information bits in the second information block, the one or more signaling bits representing a value equal to the number of symbols associated with the information bits in the second information block.

12. The method of claim 1, wherein the one or more signaling bits represent a value equal to a number of padding bits included in the second information block.

13. A wireless communication device comprising:

at least one modem;

at least one processor communicatively coupled with the at least one modem; and at least one memory communicatively coupled with the at least one processor and storing processor-readable code that, when executed by the at least one processor in conjunction with the at least one modem, is configured to:

obtain a first information block that includes a fixed number (N1) of information bits;

perform a first encoding operation on one or more of the information bits that produces a number ($L_S$) of amplitude-shaped bits;

arrange the $L_S$ amplitude-shaped bits into a second information block that includes a number ($L_{US}$) of the information bits from the first information block, the sum of $L_S$ and $L_{US}$ being less than or equal to a fixed amount (N2);

selectively add one or more padding bits to the second information block so that a length of the second information block is equal to N2;

add, to the second information block, one or more signaling bits indicating the number of amplitude-shaped bits in the second information block;

perform a second encoding operation on the second information block that produces one or more codewords, each codeword including a respective subset of bits of the second information block and one or more parity bits resulting from the second encoding operation;

arrange the subsets of bits of the second information block and the parity bits into a plurality of symbols, each symbol having an amplitude based on the respective bits arranged in the symbol, the first encoding operation producing the amplitude-shaped bits so that the amplitudes of the plurality of symbols have a non-uniform distribution; and transmit a wireless packet, including the plurality of symbols, to at least one receiving device.

14. The wireless communication device of claim 13, wherein the performing of the first encoding operation comprises:

iteratively selecting, from a look-up table (LUT), a pattern of bit values that matches a subset of the information bits, the LUT storing a plurality of patterns of bit values corresponding to a respective plurality of patterns of amplitude-shaped bits, the plurality of patterns of amplitude-shaped bits including the pattern of amplitude-shaped bits corresponding to the selected pattern of bit values.

15. The wireless communication device of claim 14, wherein the iteratively selecting comprises:
   determining, for each iteration, whether the selection of a first pattern of bit values matching a first subset of the information bits would cause the sum of $L_S$ and $L_{US}$ to be greater than N2.

16. The wireless communication device of claim 15, wherein the iteratively selecting further comprises:
   terminating the first encoding operation, without selecting the first pattern of bit values, responsive to determining that selecting the first pattern of bit values would cause the sum of $L_S$ and $L_{US}$ to be greater than N2.

17. The wireless communication device of claim 15, wherein the iteratively selecting further comprises:
   determining whether the selection of a second pattern of bit values matching a second subset of the information bits would cause the sum of $L_S$ and $L_{US}$ to be less than or equal to N2 responsive to determining that selecting the first pattern of bit values would cause the sum of $L_S$ and $L_{US}$ to be greater than N2.

18. The wireless communication device of claim 17, wherein the iteratively selecting further comprises:
   selecting the second pattern of bit values, in lieu of the first pattern of bit values, responsive to determining that the resulting sum of $L_S$ and $L_{US}$ would be less than or equal N2; and
   terminating the first encoding operation responsive to selecting the second pattern of bit values.

19. A method for wireless communication by a wireless communication device, comprising:
   receiving a wireless packet including a plurality of symbols having a plurality of amplitudes, the plurality of symbols representing a plurality of codeword bits, the plurality of amplitudes having a non-uniform distribution;
   arranging the plurality of codeword bits into one or more codewords;
   performing a first decoding operation on the one or more codewords that produces one or more respective decoded code blocks, each decoded code block including a plurality of decoded codeword bits and one or more parity bits;
   arranging the pluralities of decoded codeword bits into an information block having a fixed length (N2);
   detecting one or more signaling bits of the information block based on the fixed length N2 of the information block;
   identifying a number ($L_S$) of amplitude-shaped bits in the information block based on a value associated with the one or more signaling bits;
   performing a second decoding operation on the amplitude-shaped bits that produces a number ($L_{DS}$) of de-shaped bits;
   parsing a number ($L_{US}$) of unshaped bits from the information block based on the number $L_{DS}$ of de-shaped bits and a fixed length (N1) associated with a decoded information block; and
   arranging the de-shaped bits and the unshaped bits into the decoded information block having the fixed length N1.

20. The method of claim 19, wherein the amplitude-shaped bits represent most significant bits (MSBs) of the information block.

21. The method of claim 19, wherein the sum of $L_{US}$ and $L_{DS}$ is equal to N2.

22. The method of claim 21, further comprising:
   discarding one or more bits of the information block in excess of $L_{US}$.

23. The method of claim 22, wherein the discarded bits represent least significant bits (LSBs) of the information block.

24. The method of claim 19, wherein the performing of the second decoding operation comprises:
   selecting, from a look-up table (LUT), a pattern of de-shaped bits that matches a subset of the amplitude-shaped bits, the LUT storing a plurality of patterns of de-shaped bits corresponding to a respective plurality of patterns of amplitude-shaped bits, the plurality of de-shaped bits including the selected pattern of de-shaped bits.

25. The method of claim 24, wherein the identifying of the number of amplitude-shaped bits comprises:
   determining an estimated number of amplitude-shaped bits associated with the wireless packet based on a length of each pattern of amplitude-shaped bits in the LUT;
   determining a number ($L_{EST}$) of symbols associated with the estimated number of amplitude-shaped bits;
   determining a number ($L_{PAM}$) of symbols associated with the amplitude-shaped bits based on a difference between $L_{EST}$ and the value associated with the one or more signaling bits; and
   determining the number of amplitude-shaped bits associated with $L_{PAM}$.

26. The method of claim 19, wherein the identifying of the number of amplitude-shaped bits comprises:
   determining a number ($L_{PAM}$) of symbols associated with the amplitude-shaped bits based on the value associated with the one or more signaling bits; and
   determining the number of amplitude-shaped bits associated with $L_{PAM}$.

27. The method of claim 19, wherein the identifying of the number of amplitude-shaped bits comprises:
   determining a mean number of amplitude-shaped bits decodable based on the second decoding operation given N1 information bits;
   determining a number ($L_{MEAN}$) of symbols associated with the mean number of amplitude-shaped bits;
   determining a number ($L_{PAM}$) of symbols associated with the amplitude-shaped bits based on a difference between $L_{MEAN}$ and the value associated with the one or more signaling bits; and
   determining the number of amplitude-shaped bits associated with $L_{PAM}$.

28. The method of claim 19, wherein the identifying of the number of amplitude-shaped bits comprises:
   determining a number of padding bits included in the information block based on the value associated with the one or more signaling bits; and
   determining the number of amplitude-shaped bits based on N2, $L_{US}$, and the number of padding bits.

29. A wireless communication device comprising:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to:

receive a wireless packet including a plurality of symbols having a plurality of amplitudes, the plurality of symbols representing a plurality of codeword bits, the plurality of amplitudes having a non-uniform distribution;

arrange the plurality of codeword bits into one or more codewords;

perform a first decoding operation on the one or more codewords that produces one or more respective decoded code blocks, each decoded code block including a plurality of decoded codeword bits and one or more parity bits;

arrange the pluralities of decoded codeword bits into an information block having a fixed length (N2);

detect one or more signaling bits of the information block based on the fixed length N2 of the information block;

identify a number ($L_S$) of amplitude-shaped bits in the information block based on a value associated with the one or more signaling bits;

perform a second decoding operation on the amplitude-shaped bits that produces a number ($L_{DS}$) of de-shaped bits;

parse a number ($L_{US}$) of unshaped bits from the information block based on the number $L_{DS}$ of de-shaped bits and a fixed length (N1) associated with a decoded information block; and arrange the de-shaped bits and the unshaped bits into the decoded information block having the fixed length N1.

30. The wireless communication device of claim 29, wherein the amplitude-shaped bits represent most significant bits (MSBs) of the information block.

31. The wireless communication device of claim 29, wherein the sum of $L_{US}$ and $L_{DS}$ is equal to N2.

32. The wireless communication device of claim 31, wherein execution of the processor-readable code is further configured to:

discard one or more bits of the information block in excess of $L_{US}$.

33. The wireless communication device of claim 32, wherein the discarded bits represent least significant bits (LSBs) of the information block.

34. The wireless communication device of claim 29, wherein the performing of the second decoding operation comprises:

selecting, from a look-up table (LUT), a pattern of de-shaped bits that matches a subset of amplitude-shaped bits, the LUT storing a plurality of patterns of de-shaped bits corresponding to a respective plurality of patterns of amplitude-shaped bits, the plurality of de-shaped bits including the selected pattern of de-shaped bits.

* * * * *